(12) United States Patent
Laurusonis et al.

(10) Patent No.: US 9,443,445 B2
(45) Date of Patent: Sep. 13, 2016

(54) AUTOMATIC INJECTION TRAINING DEVICE

(71) Applicant: AbbVie Inc., North Chicago, IL (US)

(72) Inventors: Linas P. Laurusonis, Gurnee, IL (US); Philip D. Anderson, Libertyville, IL (US); Matthew M. Widman, Gurnee, IL (US); Timothy D. McLeroy, Bristol, WI (US)

(73) Assignee: AbbVie Inc., North Chicago, IL (US)

( * ) Notice: Subject to any disclaimer, the term of this patent is extended or adjusted under 35 U.S.C. 154(b) by 144 days.

(21) Appl. No.: 13/782,797

(22) Filed: Mar. 1, 2013

(65) Prior Publication Data

US 2013/0236872 A1 Sep. 12, 2013

Related U.S. Application Data

(60) Provisional application No. 61/606,258, filed on Mar. 2, 2012.

(51) Int. Cl.
*G09B 23/28* (2006.01)

(52) U.S. Cl.
CPC .................... *G09B 23/285* (2013.01)

(58) Field of Classification Search
CPC .............. A61M 5/2033; A61M 5/20; A61M 2005/206; G09B 23/285
USPC .................................................. 434/262–275
See application file for complete search history.

(56) References Cited

U.S. PATENT DOCUMENTS

| | | |
|---|---|---|
| 3,795,061 A | 3/1974 | Sarnoff et al. |
| 4,610,254 A | 9/1986 | Morgan et al. |
| 4,619,265 A | 10/1986 | Morgan et al. |
| 4,640,686 A | 2/1987 | Dalling et al. |

(Continued)

FOREIGN PATENT DOCUMENTS

| | | |
|---|---|---|
| CA | 2741354 A1 | 4/2010 |
| EP | 756878 B1 | 5/2003 |

(Continued)

OTHER PUBLICATIONS

Communication pursuant to Article 94(3) EPC issued in European Application No. 13710707.4, dated Jun. 22, 2015.

(Continued)

*Primary Examiner* — Timothy A Musselman
(74) *Attorney, Agent, or Firm* — McCarter & English, LLP; David R. Burns

(57) ABSTRACT

Exemplary embodiments of the present disclosure provide reusable training automatic injection training devices, and components thereof, to simulate and/or mimic an operation of an actual automatic injection device. Exemplary embodiments of the training device can provide audible instructions, which can be in different languages, output from circuitry associated with the training device. Exemplary embodiment of the training device can be a self-contained and portable device that mimics a shape, size, and function of an actual automatic injection device without including a needle or any drug on board. Exemplary embodiments can be implemented to train a user on an operation and/or usage of an actual automatic injection device using embodiments of the automatic injection training devices so that a user can practice an autoinjection without injecting a therapeutic agent, such as a liquid drug, into a recipient.

50 Claims, 18 Drawing Sheets

(56) References Cited

U.S. PATENT DOCUMENTS

| | | |
|---|---|---|
| 5,071,353 A | 12/1991 | van der Wal |
| 5,271,527 A | 12/1993 | Haber et al. |
| 5,300,030 A | 4/1994 | Crossman et al. |
| 5,383,864 A | 1/1995 | van den Heuvel |
| 5,567,160 A | 10/1996 | Massino |
| 5,645,571 A | 7/1997 | Olson et al. |
| 5,792,190 A | 8/1998 | Olson et al. |
| 5,797,969 A | 8/1998 | Olson et al. |
| 5,807,335 A | 9/1998 | Kriesel et al. |
| 5,845,644 A | 12/1998 | Hughes et al. |
| 5,919,212 A | 7/1999 | Olson et al. |
| 6,125,299 A | 9/2000 | Groenke et al. |
| 6,319,011 B1 | 11/2001 | Motti et al. |
| 6,325,066 B1 | 12/2001 | Hughes et al. |
| 6,328,699 B1 | 12/2001 | Eigler et al. |
| 6,334,070 B1 | 12/2001 | Nova et al. |
| 6,502,699 B1 | 1/2003 | Watson |
| 6,697,671 B1 | 2/2004 | Nova et al. |
| 6,872,080 B2 | 3/2005 | Pastrick et al. |
| 6,969,259 B2 | 11/2005 | Pastrick et al. |
| 6,970,742 B2 | 11/2005 | Mann et al. |
| 7,115,095 B2 | 10/2006 | Eigler et al. |
| 7,137,953 B2 | 11/2006 | Eigler et al. |
| 7,416,540 B2 | 8/2008 | Edwards et al. |
| 7,483,743 B2 | 1/2009 | Mann et al. |
| 7,590,449 B2 | 9/2009 | Mann et al. |
| 7,648,482 B2 | 1/2010 | Edwards et al. |
| 7,648,483 B2 | 1/2010 | Edwards et al. |
| 7,682,155 B2 | 3/2010 | Raven et al. |
| 7,717,854 B2 | 5/2010 | Mann et al. |
| 7,731,686 B2 | 6/2010 | Edwards et al. |
| 7,731,690 B2 | 6/2010 | Edwards et al. |
| 7,749,194 B2 | 7/2010 | Edwards et al. |
| 7,918,823 B2 | 4/2011 | Edwards et al. |
| 7,947,017 B2 | 5/2011 | Edwards et al. |
| 8,016,788 B2 | 9/2011 | Edwards et al. |
| 8,021,344 B2 | 9/2011 | Edwards et al. |
| 8,069,097 B2 | 11/2011 | Patrick et al. |
| 8,105,281 B2 | 1/2012 | Edwards et al. |
| 8,123,719 B2 | 2/2012 | Edwards et al. |
| 8,172,082 B2 | 5/2012 | Edwards et al. |
| 8,206,360 B2 | 6/2012 | Edwards et al. |
| 8,226,610 B2 | 7/2012 | Edwards et al. |
| 8,231,573 B2 | 7/2012 | Edwards et al. |
| 8,313,466 B2 | 11/2012 | Edwards et al. |
| 8,361,026 B2 | 1/2013 | Edwards et al. |
| 8,425,462 B2 | 4/2013 | Edwards et al. |
| 2002/0049415 A1 | 4/2002 | Fukuda |
| 2003/0055345 A1 | 3/2003 | Eigler et al. |
| 2003/0153868 A1 | 8/2003 | Azizi et al. |
| 2003/0216785 A1 | 11/2003 | Edwards et al. |
| 2004/0024367 A1 | 2/2004 | Gilbert |
| 2004/0143298 A1 | 7/2004 | Nova et al. |
| 2004/0229854 A1 | 11/2004 | Haan De |
| 2005/0020979 A1 | 1/2005 | Westbye et al. |
| 2005/0095208 A1 | 5/2005 | Battaglia et al. |
| 2005/0137196 A1 | 6/2005 | Timmer et al. |
| 2005/0261742 A1 | 11/2005 | Nova et al. |
| 2005/0273061 A1 | 12/2005 | Hommann et al. |
| 2006/0009810 A1 | 1/2006 | Mann et al. |
| 2006/0058848 A1 | 3/2006 | Piraino et al. |
| 2006/0073448 A1* | 4/2006 | Nita .................. G09B 19/00 434/219 |
| 2006/0074519 A1 | 4/2006 | Barker et al. |
| 2006/0089540 A1 | 4/2006 | Meissner et al. |
| 2006/0140907 A1 | 6/2006 | Blumberg et al. |
| 2006/0178865 A1 | 8/2006 | Edwards et al. |
| 2006/0204939 A1 | 9/2006 | Bardsley et al. |
| 2007/0032831 A1 | 2/2007 | Eigler et al. |
| 2007/0088223 A1 | 4/2007 | Mann et al. |
| 2007/0111175 A1 | 5/2007 | Raven et al. |
| 2007/0129708 A1 | 6/2007 | Edwards et al. |
| 2008/0059133 A1 | 3/2008 | Edwards et al. |
| 2008/0103490 A1 | 5/2008 | Edwards et al. |
| 2008/0269689 A1 | 10/2008 | Edwards et al. |
| 2009/0024112 A1 | 1/2009 | Edwards et al. |
| 2010/0022963 A1 | 1/2010 | Edwards et al. |
| 2010/0106208 A1* | 4/2010 | Freeman .................. 607/5 |
| 2010/0121276 A1 | 5/2010 | Edwards et al. |
| 2010/0160894 A1* | 6/2010 | Julian et al. .................. 604/506 |
| 2010/0211005 A1 | 8/2010 | Edwards et al. |
| 2010/0241075 A1 | 9/2010 | Edwards et al. |
| 2010/0309012 A1 | 12/2010 | Edwards et al. |
| 2010/0318035 A1 | 12/2010 | Edwards et al. |
| 2011/0319822 A1 | 12/2011 | Edwards et al. |
| 2012/0008811 A1 | 1/2012 | Edwards et al. |
| 2012/0015335 A1 | 1/2012 | Smith et al. |
| 2012/0071829 A1 | 3/2012 | Edwards et al. |
| 2012/0116318 A1 | 5/2012 | Edwards et al. |
| 2012/0280815 A1* | 11/2012 | Edwards et al. ........... 340/568.1 |

FOREIGN PATENT DOCUMENTS

| | | |
|---|---|---|
| EP | 757912 B1 | 3/2004 |
| EP | 1419798 A3 | 8/2005 |
| EP | 1637181 A1 | 3/2006 |
| EP | 1257321 B1 | 7/2008 |
| EP | 2180459 A1 | 4/2010 |
| JP | 2006-507060 A | 3/2006 |
| WO | 9943283 A1 | 9/1999 |
| WO | 0151123 A1 | 7/2001 |
| WO | 2004041330 A2 | 5/2004 |
| WO | 2005000206 A2 | 1/2005 |
| WO | 2005115509 A1 | 12/2005 |
| WO | 2006057636 A1 | 6/2006 |
| WO | 2006083876 A2 | 8/2006 |
| WO | 2006083876 A3 | 8/2006 |
| WO | 2007056231 | 5/2007 |
| WO | 2007126851 A2 | 11/2007 |
| WO | 2008064092 A2 | 5/2008 |
| WO | 2008064092 A3 | 5/2008 |
| WO | 2008091838 A2 | 7/2008 |
| WO | 2008091838 A3 | 7/2008 |
| WO | 2009140251 A2 | 11/2009 |
| WO | 2009140251 A3 | 11/2009 |
| WO | 2010046319 A1 | 4/2010 |
| WO | 2010056712 A1 | 5/2010 |

OTHER PUBLICATIONS

Decision of Rejection for Japanese Application No. 2012-188259, mailed Nov. 4, 2014.
First Examination Report issued in New Zealand Application No. 628885, dated May 12, 2015.
International Preliminary Report on Patentability issued in International Application No. PCT/US2007/015095, mailed Jun. 19, 2009.
International Preliminary Report on Patentability issued in PCT/US2013/028619, dated Sep. 2, 2014.
International Search Report issued in International Application No. PCT/US2007/015095, dated Sep. 11, 2008.
Notice of Rejection received for Japanese Application No. 2012-188259, mailed Nov. 26, 2013.
Patent Examination Report No. 1 issued in Australian Application No. 2013204609, dated Jun. 23, 2014.
Patent Examination Report received for Australian Application No. 2013203670, dated Jul. 7, 2014.
Written Opinion issued in International Application No. PCT/US2007/015095, mailed Sep. 11, 2008.
PCT International Search Report and Written Opinion Dated Jun. 26, 2013 for PCT/US2013/028619.
Chinese Office Action, English Translation of the Office Action, Chinese Appln No. 201380023221.4, May 5, 2016, (8 pages).

* cited by examiner

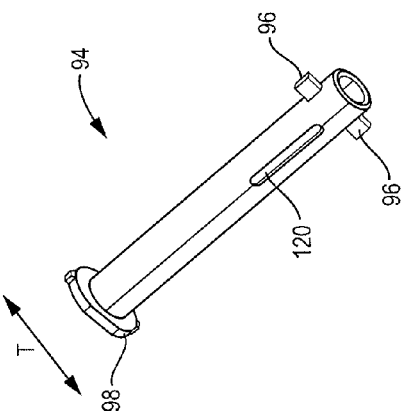
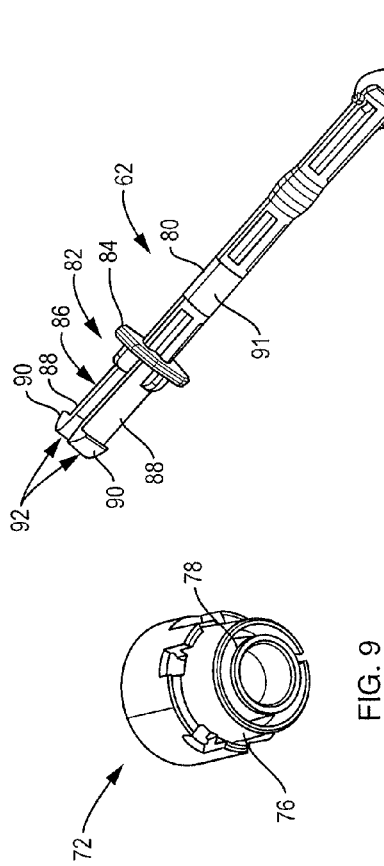
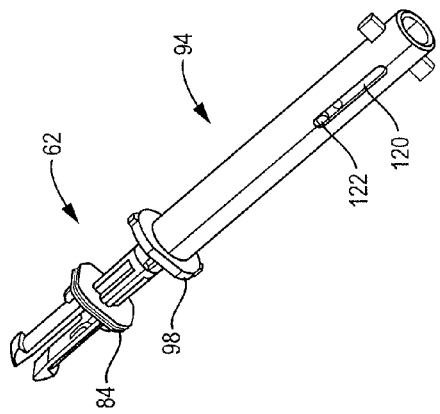
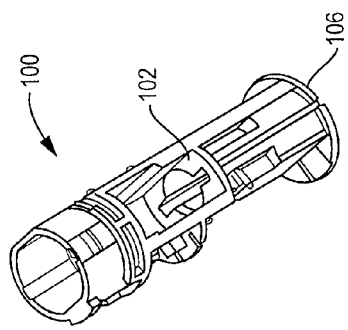
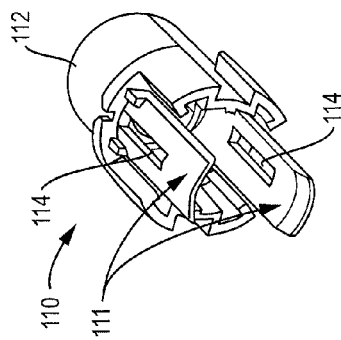
FIG. 9
FIG. 10
FIG. 11
FIG. 12
FIG. 13
FIG. 14

AUTOMATIC INJECTION TRAINING DEVICE

RELATED APPLICATION

This application claims priority to U.S. Provisional Application No. 61/606,258, filed on Mar. 2, 2012, the entirety of which is incorporated herein by reference.

TECHNICAL FIELD

Exemplary embodiments of the present disclosure relate to automatic injection training devices for simulating or mimicking an automatic injection and/or an operation sequence associated with automatic injection devices, and particularly to reusable, interactive automatic injection training devices having associated circuitry configurable or programmable to train a user on an operational sequence of actual automatic injection devices.

BACKGROUND

One of the most common routes of administration for medications is by injection, such as intravenous, subcutaneous or intramuscular injection. A syringe containing the medication is used for the injection, which typically is carried out by trained medical personnel. In certain instances, a patient or other individuals can be trained to use the syringe to allow for self-injection or injection of another individual. Moreover, certain medications are formulated in pre-filled syringes for patient use, to avoid the need for the patient to fill the syringe.

Automatic injection devices offer an alternative to a syringe for delivering a medication and typically require more training than conventional syringes due to a complexity of automatic injection devices. Automatic injection devices can be used to administer a therapeutic agent, such as a drug, to a recipient for various illnesses, diseases, and conditions, such as, for example, Rheumatoid Arthritis, Gastroenterology, Dermatology, Multiple Sclerosis, and so on. For example, automatic injection devices configured to deliver a therapeutic agent, e.g., medication or liquid dose of a drug such as a TNFα inhibitor.

SUMMARY

Exemplary embodiments of the present disclosure provide reusable interactive automatic injection training devices, components thereof, kits, and methods for training, a user on an operation and/or proper usage of an automatic injection training device and/or an automatic injection device. In an exemplary embodiment, an automatic injection training device is provided with a working firing mechanism to simulate or mimic an operation of an automatic injection device configured to inject a dose of medication therapeutic agent, such as, for example, a liquid dose of a TNFα inhibitor, from a needle of a syringe. Exemplary embodiments of the automatic injection training devices are provided devoid or free of a therapeutic agent, syringe, and/or needle such that embodiments of the automatic injection training device simulate or mimic an automatic injection and are unsuitable for actually injecting a therapeutic agent into a patient.

Embodiments of the automatic injection training devices can be used to train a user on an operational sequence of an actual automatic injection device that includes a therapeutic agent, such as a TNFα inhibitor, such as, for example, adalimumab. TNFα inhibitors can be effective in the treatment of autoimmune disorders such as rheumatoid arthritis, psoriatic arthritis and Crohn's Disease. Such inhibitors, which include biological agents such as antibodies and antibody fusion proteins, typically are delivered by injection. The TNFα inhibitor adalimumab (HUMIRA®; Abbott Laboratories, Lake County, Ill.), for example, has been used in an automatic injection devices.

In exemplary embodiments, an automatic injection training device can provide audible instructions to a user. The automatic injection training device can include mechanical elements that replicate or model mechanical elements of a corresponding automatic injection device to simulate or mimic an automatic injection, and can include circuitry configured and/or programmed to train a user on the operation and/or use of an automatic injection training device and/or an automatic injection device. In exemplary embodiments, the circuitry can be configured to output an instructional script that includes recorded and/or computer generated speech, in one or more languages, such as English, Spanish, French, German, Italian, and so on, to train a user on an operational sequence of an actual automatic injection device using embodiments of the automatic injection training device. Exemplary embodiments of the automatic injection training device can also include a control interface to control the output of the circuitry. For example, the control interface can include a control button to play/pause the instructional script, a control button to select an output language of the instructional script, and a control button to replay previous instructional steps output by the automatic injection training device. In some embodiments, the control interface may or may not include a volume control.

Exemplary embodiments of the automatic injection training device can be implemented to educate users on the proper operation and usage of a corresponding automatic injection device, make prospective and current users of automatic injection devices feel more comfortable and confident with automatic injection devices as well as the autoinjection, and to help users understand the proper steps of an automatic injection. Exemplary embodiments of the automatic injection training device can be used by a user before or while the user administers an autoinjection using an actual automatic injection device corresponding to the automatic injection training device and/or can be used as needed/desired by the user.

In one embodiment, an automatic injection training device to simulate an automatic injection is disclosed. The training device can include an elongate housing, in some embodiments an elongate tubular housing with interior space, a movable member, a firing assembly, and circuitry disposed within the housing. The elongate housing extends along a longitudinal axis. The housing has a proximal end and a distal end, wherein the proximal end includes an actuation member, such as a firing button. The movable member is movable with respect to the housing. The firing assembly is configured to actuate the movable member to simulate an automatic injection in response to an actuation of the actuation member. The circuitry is disposed within the housing and is responsive to user input to control an output of audio to train a user on an operational sequence of an actual automatic injection device using the training device.

In another embodiment, a method for training a user on an operational sequence associated with an automatic injection device using the training device is disclosed. The method includes receiving an input selection from a user via a control interface of an automatic injection training device. The control interface controls an operation of circuitry included in the automatic injection training device. The method also includes outputting audio via the circuitry to train the user on an operation of the automatic injection device in response to the input selection, actuating a firing assembly disposed within a housing of the device to simulate an automatic injection in response to a depression of a firing button disposed at a proximal end of the housing by the user, and displaying an indicator to the user to indicate a completion of the automatic injection.

In yet another embodiment, a non-transitory computer-readable medium embedded in an automatic injection training device is disclosed. The non-transitory computer readable medium stores instructions executable by a programmable processing device to cause the programmable processing device to output audio via a speaker in the automatic injection training device in response to an activation of a control on a control interface of the automatic injection training device to train a user on an operational sequence of the automatic injection training device in response to the input selection and to instruct the user to actuate a firing assembly disposed within a housing of the device to simulate an automatic injection in response to a depression of a firing button disposed at a proximal end of the housing by the user.

In yet another embodiment, a kit including an automatic injection training device is disclosed. The automatic injection training device can simulate an automatic injection. The kit can also include informational material. The informational material includes information corresponding to at least one of a description of the automatic injection training device, a description of a corresponding actual automatic injection device, information to train the user on a use of the automatic injection training device, information to train the user on a use of the actual automatic injection device, and information to train the user on an operational sequence of an actual automatic injection device using the training device. In some embodiments, the automatic injection training device and/or informational material can be included in a container.

In yet another embodiment, a training device that is devoid of a therapeutic agent is disclosed. The training device includes a first activation button and a second activation button. The first activation button activates a movable member of the training device. The second activation button outputs audio from the training device.

In yet another embodiment, a method of training a user on an automatic injection of a TNFα inhibitor is disclosed in which an automatic injection training device devoid of the TNFα inhibitor is used and corresponds to an actual automatic injection device that includes the TNFα inhibitor. The method includes receiving an input selection from a user via a control interface of the automatic injection training device. The control interface controls an operation of circuitry included in the automatic injection training device. The method also includes outputting audio via the circuitry to train the user on an automatic injection of the TNFα inhibitor in response to the input selection, actuating a firing assembly disposed within a housing of the device to simulate an automatic injection of the TNFα inhibitor in response to a depression of a firing button disposed at a proximal end of the housing by the user, and displaying an indicator to the user to indicate the automatic injection of the TNFα inhibitor simulated by the training device.

BRIEF DESCRIPTION OF THE FIGURES

The foregoing and other objects, features and advantages provided by the present disclosure will be more fully understood from the following description of exemplary embodiments when read together with the accompanying drawings, wherein like elements have like reference numbers, and in which:

FIG. 9 is a perspective view of an exemplary triggering member of an exemplary embodiment of the automatic injection training device.

FIG. 10 is a perspective view of an exemplary plunger of an exemplary embodiment of the automatic injection training device.

FIG. 11 is a perspective view of an exemplary sleeve of an exemplary embodiment of the automatic injection training device.

FIG. 12 is a perspective view of an exemplary plunger of FIG. 20 and the sleeve of FIG. 21 in an assembled formed.

FIG. 13 is a perspective view of an exemplary sleeve carrier of an exemplary embodiment of the automatic injection training device.

FIG. 14 is a perspective view of an exemplary mock lockout shroud of an exemplary embodiment of the automatic injection training device simulating a needle stick protection feature.

DETAILED DESCRIPTION

Figure 1:
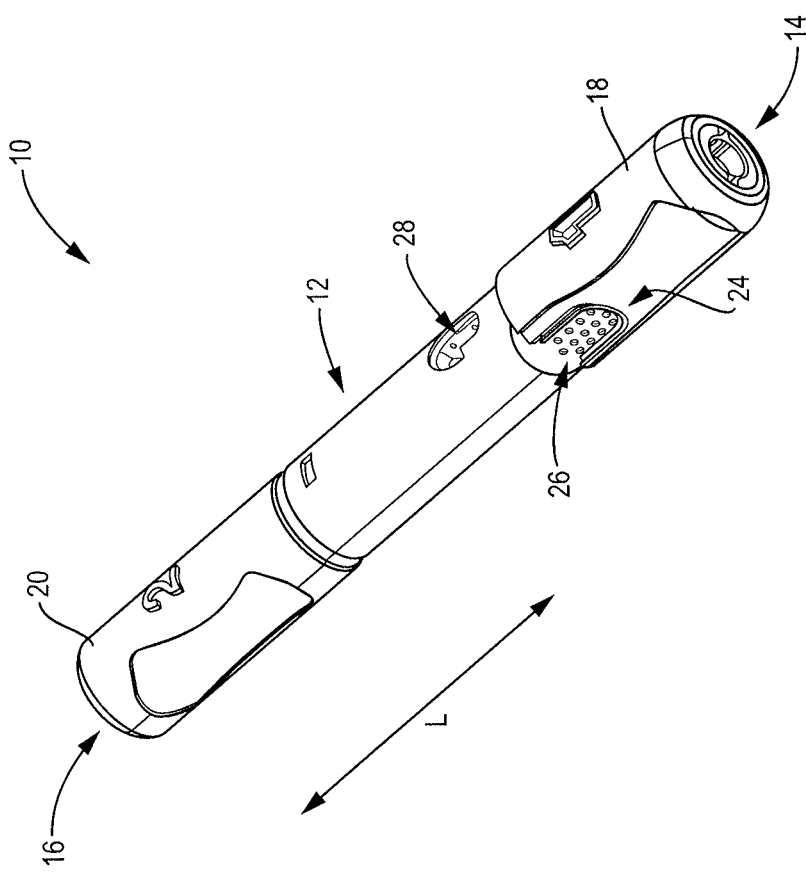
FIG. 1 shows a perspective view of an exemplary embodiment of an automatic injection training device configured to simulate and/or mimic an automatic injection device.

Exemplary embodiments of the present disclosure provide reusable, interactive, automatic injection training devices, and components thereof, to simulate and/or mimic an actual automatic injection of a therapeutic agent, e.g., a TNFα inhibitor, such as, for example, adalimumab. Exemplary embodiments can be used to train a user on a proper use and/or operational sequence of an actual automatic injection device. The automatic injection training devices can include a working firing mechanism that can be activated by a user in a substantially similar manner that an actual automatic injection device is activated (e.g., by actuating an activation button), but unlike an actual automatic injection device, embodiments of the automatic injection training devices are devoid of a therapeutic agent, syringe, needle, and/or a needleshield remover.

Exemplary embodiments of the training device can provide audible instructions, which can be in different languages, output from circuitry associated with the training device. The circuitry can include a control interface including one or more controls that are selectable by the user to activate and/or control an operation of the circuitry. In exemplary embodiments, the circuitry can include sensors that can, at least in part, control an output of the audible instructions.

In exemplary embodiments, the training device can be a self-contained and portable device that mimics a shape, size, and/or function of an actual automatic injection device without including a needle or any drug on board. For example, in some embodiments, the training device can have dimensions that are less than, greater than, or substantially equal to dimensions of the corresponding automatic injection device.

Exemplary embodiments can be implemented to train a user on an operation and/or usage of an actual automatic injection device using embodiments of the automatic injection training devices so that a user can practice an autoinjection without injecting a therapeutic agent, such as a liquid drug, into a recipient (e.g., the user).

As used herein, an "automatic injection training device" is intended to refer to a device that simulates or mimics an operation and/or function of an automatic injection device to train a user on an operational sequence associated with the automatic injection device. In some embodiments, an automatic injection training device can be implemented as an automatic injection training pen, i.e., a training pen or autoinjection training pen (used interchangeably herein). In some embodiments, the automatic injection training devices can have a look and feel of using actual automatic injection devices, but are not suitable for administering a therapeutic agent, e.g., a medication, because it lacks one or more necessary components for administration of a therapeutic agent, e.g., a medication, such as an anti-TNF (i.e., a TNFα inhibitor, such as adalimumab, in a liquid solution), a syringe, a needle, and/or a needleshield remover. A needleshield remover of an actual automatic injection device can be disposed in a removable cap configured to engage a distal end of the automatic injection device and can be configured to remove the needleshield from the actual automatic injection device to expose the needle.

As used herein, an "automatic injection device," "actual automatic injection device," and "autoinjector" are intended to refer to a device that enables an individual (also referred to herein as a user or a patient) to administer a dosage of a therapeutic agent, such as a liquid medication, wherein the device differs from a standard syringe by the inclusion of a mechanism for automatically actuating a syringe to deliver medication to an individual by automatic injection when the mechanism is engaged. An automatic injection device can be configured to administer an anti-TNF (i.e., a TNFα inhibitor, such as adalimumab) to a patient.

As used herein, the terms "train" and "training" are intended to refer to providing a user with information regarding a use, operation, function, process or other aspect associated with an automatic injection. For example, exemplary embodiments of the training devices of the present disclosure can train a user by coaching, guiding, and/or instructing a user on a use, operation, function, process associated with an automatic injection training device and/or an automatic injection device including an operational sequence for an automatic injection.

As used herein, the terms "simulate" and "mimic" are used interchangeably and are intended to refer to an imitation of an operation, function, and/or process performed by an object or thing using a model or replica of the object or thing.

As used herein, the terms "replica," "model," and "replicate" are used interchangeably and are intended to refer to a physical rendering of an object or thing that is typically built to resemble an actual object or thing, but which is not a true copy of the actual object or thing and which may not include some or all of the components of the actual object or thing.

As used herein, a "user" is intended to refer to an individual that uses the automatic injection training device and/or the automatic injection device and a "recipient" refers to an individual that receives a simulated automatic injection from the automatic injection training device and/or receives an automatic injection from the automatic injection device. In some instances a user and a recipient can be the same individual.

FIG. 1 shows a perspective view of an exemplary reusable, interactive automatic injection training device 10 configured and dimensioned to model or replicate an actual automatic injection device. For example, the training device 10 can have the look and feel of the actual automatic injection device with operational components that are similar to the operational components of the actual automatic injection device, but unlike an actual automatic injection device, the training device 10 can be devoid of a therapeutic agent, a syringe, a needle, and/or a needleshield remover. In some embodiments, the training device can be implemented to simulate an automatic injection of a TNFα inhibitor (e.g., a liquid solution including adalimumab) by an actual automatic injection device that includes the TNFα inhibitor. The training device 10 can also include a working firing mechanism as described herein that can be activated by a user to simulate an automatic injection. Additionally, the training device 10 can include circuitry as described herein for training a user on an operational sequence for an automatic injection.

As shown in FIG. 1, the training device 10 can have an elongated housing 12 extending along a longitudinal axis L from a first (distal) end 14 to a second (proximal) end 16. In the present embodiment, the housing 12 can have a generally tubular shape such that the training device 10 is configured as a training pen. The housing 12 may be formed of any suitable material including, but not limited to, plastic and other known materials. The housing 12 can house components of the training device 10 including, for example, mechanical, electrical, and/or electromechanical components, which can operate to simulate and/or mimic an operation of an actual automatic injection device and/or can provide audible and/or visual instructions, cues, and/or other suitable information for training the user on the operation and/or usage of the training device 10 and/or an automatic injection device corresponding to the training device 10. While the housing 12 has a tubular configuration in the present embodiment, one of ordinary skill in the art will recognize that the housing 12 may have any suitable size, shape and configuration to replicate a corresponding automatic injection device.

The first end 14 of the training device 10 can include a first removable end cap 18 and the second end 16 of the training device 10 can include a second removable end cap 20. In exemplary embodiments, the removable cap 18 may include a boss (not shown) for locking and/or joining the cap 18 of the device 10 until the user is ready to activate the device 10. Alternatively, the removable cap 18 may include a threaded screw portion (not shown), and the internal surface of the housing 12 may include a screw thread. In other embodiments, the cap 18 simply slides onto the first end 14 of the training device 10 to form a friction fit. The cap 18 can have a cutout section 24 to expose a perforated portion 26 of the housing 12 when the cap 18 is fully engaged with the housing 12. In other exemplary embodiments, the cap 18 can have openings, such as holes or slits instead of the cutout section 24 such that the cap 18 covers the perforated portion 26 of the housing 12 when the cap 18 is fully engaged with the housing 12, but permits sound waves to radiate from the perforated portion through the openings (FIG. 13). Those skilled in the art will recognize that any suitable mating mechanism may be used to selectively secure the cap 18 to the housing 12 in accordance with the teachings of exemplary embodiments and that other cap configurations can be used for the cap 18 in relation to the perforated portion 26 of the housing 12.

The housing 12 and caps 18, 20 can include graphics, symbols and/or numbers to facilitate use of the training device 10 and can replicate graphics, symbols, and/or numbers disposed on an actual automatic injection device corresponding to the training device 10. For example, the cap 18 can be labeled with a "1" to indicate that a patient should remove the first cap 18 of the training device 10 first, and the cap 20 can be labeled with a "2" to indicate that the cap 20 should be removed after the cap 18 is removed. One of ordinary skill in the art will recognize that the device 10 may have any suitable graphics, symbols and/or numbers to facilitate patient instruction, or the device 10 may omit such graphics, symbols and/or numbers. In some embodiments, the graphics, symbols, and/or numbers can be illumined using one or more light sources, such as light emitting diodes.

The perforated portion 26 of the housing 12 can include openings, such as holes, formed therein to provide openings through which a speaker (obscured) disposed within the housing 12 can radiate sound waves. In exemplary embodiments, the speaker can be disposed directly behind the perforated portion 26 of the housing 12.

The housing 12 can include one more display windows 28, at least one of which is obstructed in the present view, through which a visual indicator can appear to simulate or mimic completion of an injection. One or more of the windows 28 may include an opening in the sidewall of the housing 12, or may include a translucent material in the housing 12 to allow viewing of the interior of the device 10. In the present embodiment, the illustrated one of the windows 28 can be formed as an opening in the housing 12 to permit interaction between the exterior of the housing 12 and the interior of the housing 12.

Figure 2:
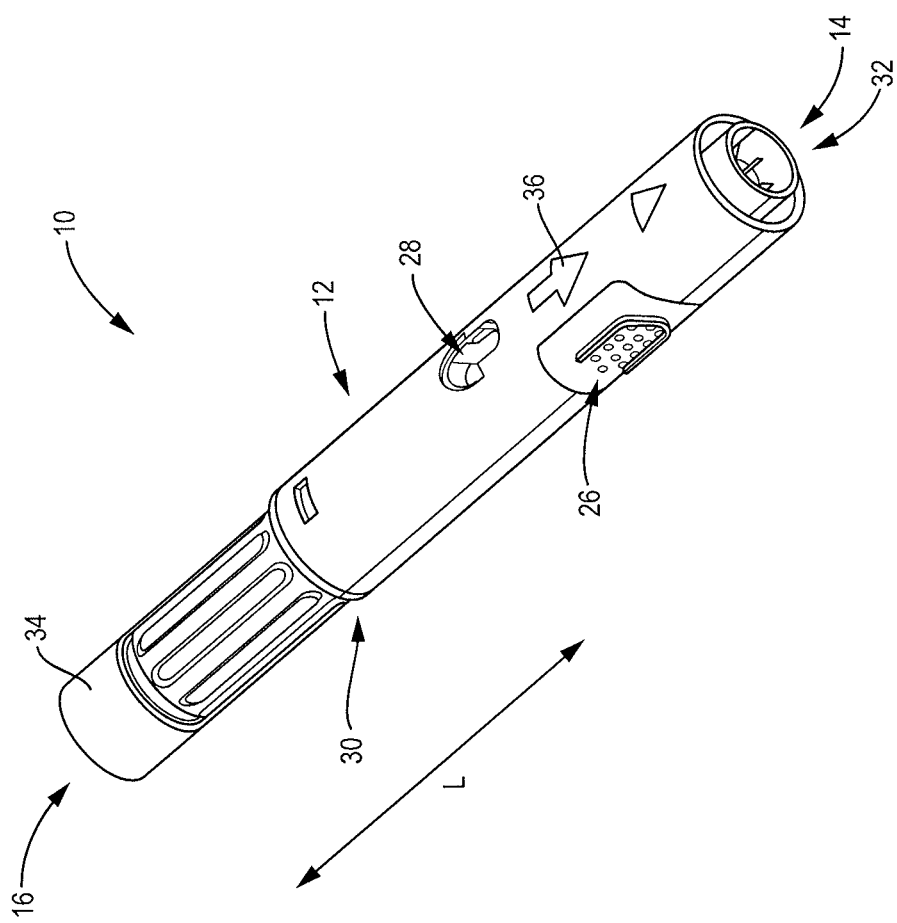
FIG. 2 shows a perspective view of the automatic injection training device of FIG. 1 with its end caps removed.

FIG. 2 shows a perspective view of the device 10 with the end caps 18, 20 removed. As shown in FIG. 2, the housing 12 can have a wider diameter at the first end 14 than at the second end 16. A step 30 may be formed at the transition between the two diameters to accommodate the second cap 20 and to facilitate seating of the second cap 20 on the second end 16 of the housing 12 (FIG. 1).

The first end 14 of the housing 12 corresponds to a distal end of the housing 12 and is configured to be placed in contact with a body of an individual, such as the user's body when a self-injection is being simulated or a body of another person when the user is simulating an injection of another person. In exemplary embodiments, the first end 14 of the housing 12 can include an opening 32 to model or replicate an opening corresponding to an opening formed in a first end of an actual automatic injection device corresponding to the device 10. In the actual automatic injection device, a needle of a syringe extends through and projects from the opening upon actuation of the automatic injection device such that the needle moves from a retracted position to a protracted position. However, no needle is included in the device 10.

The second end 16 of the housing 12 can include a firing engagement mechanism, e.g., a firing button 34 or first activation button, for actuating a firing assembly that simulates or mimics a firing engagement mechanism of a corresponding automatic injection device such that the training device 10 provides a working firing mechanism to model the firing mechanism of the corresponding automatic injection device to facilitate interaction between the user and the training device 10, as described in more detail below.

In some embodiments, the housing 12 can include an arrow 36 disposed in or on an outer surface of the housing 12. The arrow 36 can point towards the first end 14 of the device 10 to indicate how the device 10 should be held relative to an injection area of a patient (i.e., with the first end 14 adjacent to the injection site). In some embodiments, the arrow can be illuminated using one or more light emitting diodes.

Figure 3:
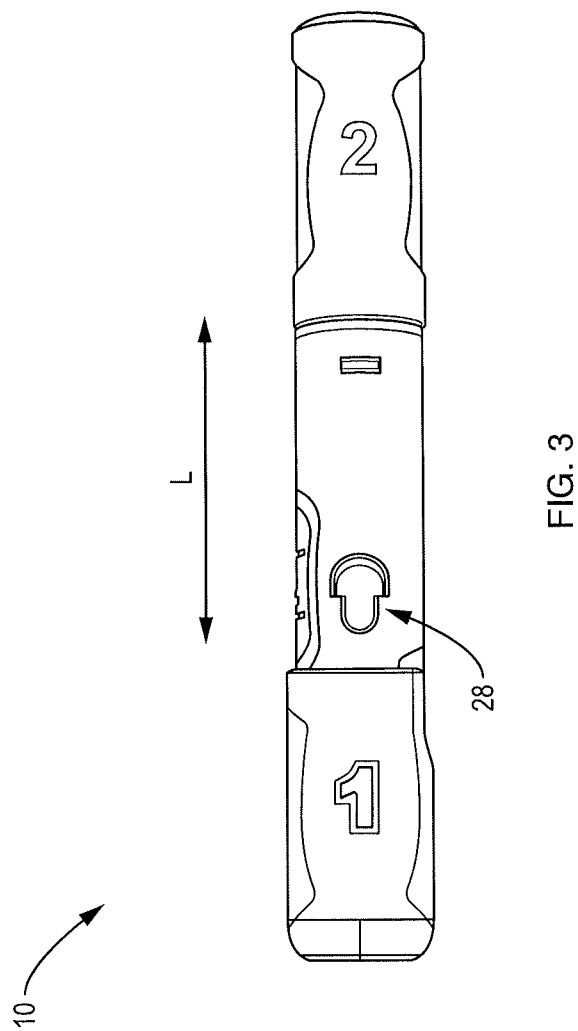
FIG. 3 is an exemplary side view of the device depicted in FIG. 1.
Figure 4:
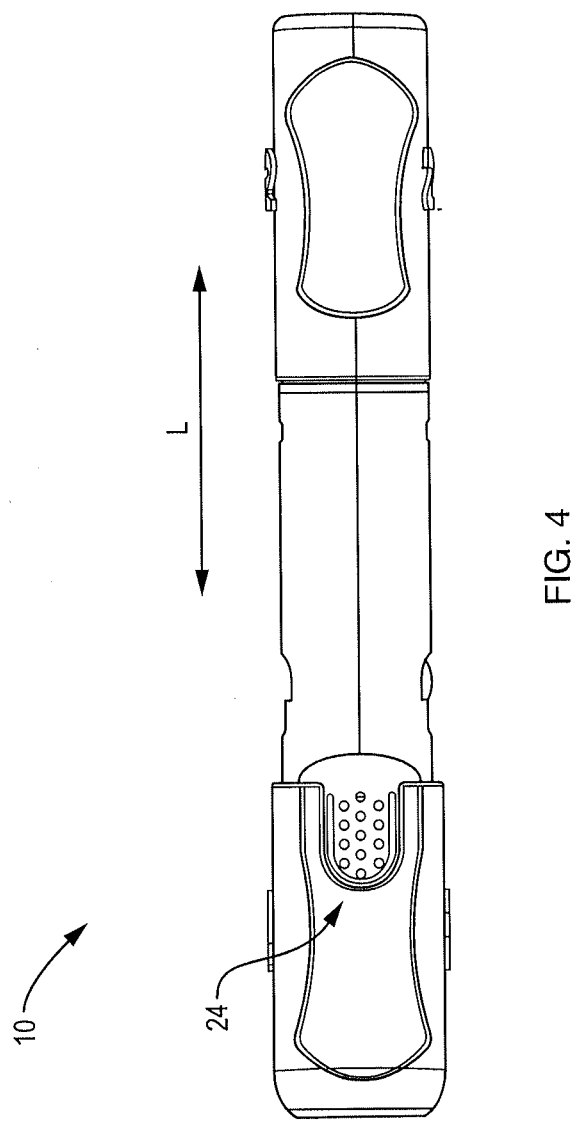
FIG. 4 is another exemplary side view of the device depicted in FIG. 3 rotated 90° about its longitudinal axis with respect to FIG. 3.
Figure 5:
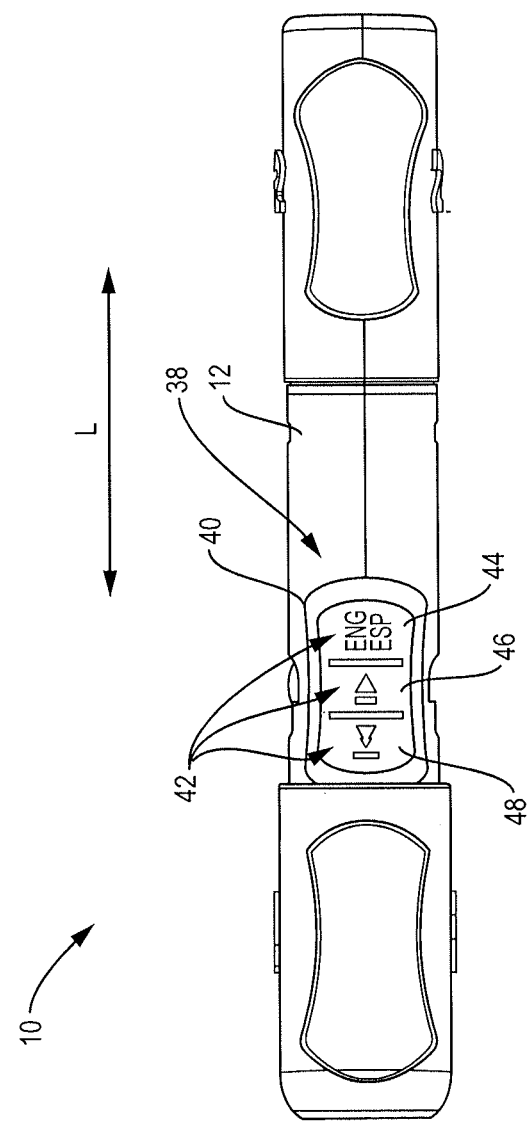
FIG. 5 is another exemplary side view of the device depicted in FIG. 3 rotated 270° about its longitudinal axis with respect to FIG. 3.

FIGS. 3-5 show side views of an exemplary embodiment of the device 10. In the present embodiment, the window 28 can have a key-hole shaped opening (FIG. 3) and the speaker cut out 24 in the end cap 18 have a generally U-shaped perimeter (FIG. 4), although those skilled in the art will recognize that the windows 28 and the cut out 24 can have a different shape. As shown in FIG. 5, the housing 12 can include a control interface portion 38 having a control interface 40 to provide controls to facilitate interaction between the user of the device 10 and the circuitry (obscured) within the device 10. The control interface 40 can include controls 42, such as a language selection button 44, a play/pause button 46 (e.g., a second activation button), and a back button 48.

The button 44 can be selected (e.g., depressed) by the user to select a language in which the audio script can be output by the device 10. For example, in the present embodiment, the training device 10 can output the audio script in English or Spanish based on an actuation of the button 44 by the user. Graphics, symbols, and/or text can be disposed on the button 44 to identify the available languages in which the audio script can be output. For example, in the present embodiment, the button 44 can include the abbreviation "Eng" for English and "Esp" for Spanish. In some embodiments, the "Eng" or the "Esp" can be illuminated (e.g., via one or more light emitting diodes) to indicate the language currently selected as the output language of the device 10. While the present embodiment includes English and Spanish as possible output languages those skilled in the art will recognize that other output languages can be implemented, such as, for example, German, French, Italian, Greek, Chinese, Japanese, Indian, or any other language.

The button 46 can be selected (e.g., depressed) by the user to play or pause the output of recorded speech from the device 10. In some embodiments, the button 46 can be configured to implement other operations including turning the circuitry on or off, advancing the audio output of the training device 10 to a subsequent step in the operational sequence and/or to reset the device 10. The operation of the button 48 can depend on a quantity of times that the button 48 is depressed and time period between depressions as described in more detail below.

The button 48 can be selected (e.g., depressed) by the user to repeat recorded speech previously output from the device 10. For example, upon actuation of the button 48, the device 10 can repeat the recorded speech output immediately previous to the actuation of the button 48. In some embodiments, when the user actuates the button 48 repeatedly, the user can step backwards through the previously output audio to listen to recorded speech that was previous output by the device during the automatic injection process.

Figure 6:
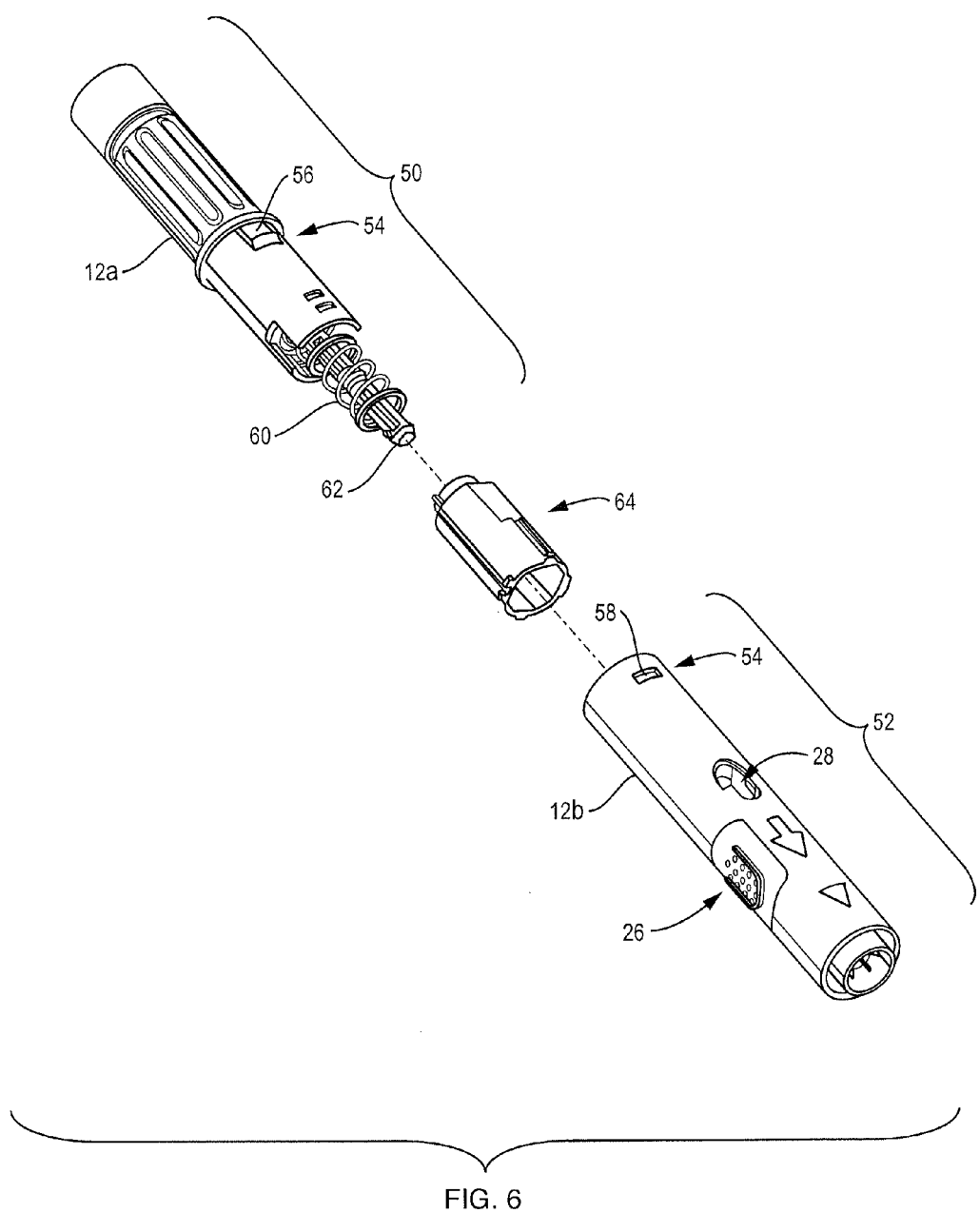
FIG. 6 shows a perspective partial exploded view of a housing assembly of the device depicted in FIG. 1.

As shown in FIG. 6, an exemplary embodiment of the training device 10 can be formed of assemblies 50, 52, which can be operatively coupled to form the assembled training device 10. The assembly 50 can include a proximal housing 12a and the assembly 52 can include a distal housing 12b, which when combined can form the housing 12 of the device 10. In exemplary embodiments, the housing 12a of the assembly 50 can be interlockingly coupled to the housing 12b via interlocking members 54. For example, the housing 12a of the assembly 50 can include resilient interlocking tabs 56 protruding radially from the housing 12a and the assembly 52 can include grooves and/or channels 58 formed to receive the interlocking tabs 56.

The assembly 50 can be referred to as a firing body and can include the exemplary firing button 34, the exemplary proximal housing component 12a, a biasing member, such as coil spring 60 and/or other biasing mechanisms, and an actuator component 62, as well as one or more components disposed within the proximal housing component 12b, such as a power source (e.g., batteries), brackets, and/or other mechanical, electrical, or electromechanical components. The firing button 34 can be a cap covering a proximal end of the housing component 12a. The illustrative firing button 34 can be configured to slide relative to the proximal housing component 12a to actuate the plunger 62. The spring 60 and plunger 62 can extend from a distal end of the housing component 12a and can be received within the housing 12b of the assembly 52 when the training device 10 is assembled. In exemplary embodiments, when the device 10 is assembled, the spring 60 is biased to urge the plunger 62 forward along the longitudinal axis L towards the first end 14 of the training device 10 upon activation of the firing button 34 such that the firing button 44 releases the plunger 62 and allows the spring 60 to propel the plunger 62 forward.

The assembly 52 can be referred to as the main body of the device 10 and can correspond to a syringe housing assembly of a corresponding automatic injection device. The assembly 52 can include the distal housing component 12b having the perforated portion 26, windows 28, and the control interface 34 (FIG. 5) disposed therein. The housing 12b can also house other mechanical, electrical, and/or electromechanical components, such as a tubular sleeve member (obscured) that receives the plunger 62 of the assembly 50, a sleeve biasing member (obscured), and circuitry (obscured) for training a user as discussed in more detail below.

A plunger actuation holder 64 can be provided to bridge the assemblies 50, 52; thereby holding the plunger in the retracted position until activated. The plunger actuation holder 64 can have a generally tubular shape and can be disposable within the housings 12a, 12b when the housings 12a, 12b are assembled to form the device 10. The spring 60 and plunger 62 of the assembly 50 can pass through the interior of the plunger actuation holder 64 and the plunger actuation holder 64 can operate to selectively retain the plunger 62 in a retracted set position when the device 10 is assembled and before the firing button 34 is activated.

Figure 7A:
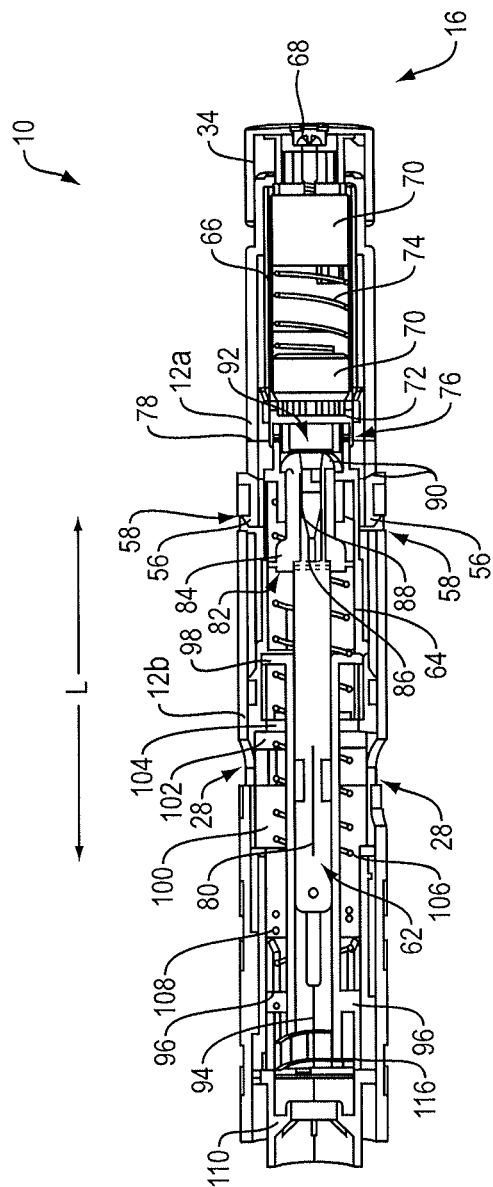
FIGS. 7A and 7B illustrate cross-sectional views of an exemplary embodiment of an automatic injection training device at 90° offset angles from each other about the longitudinal axis, in which the assemblies depicted in FIG. 6 can be operatively coupled to form an assembled device of FIG. 1.
Figure 7B:
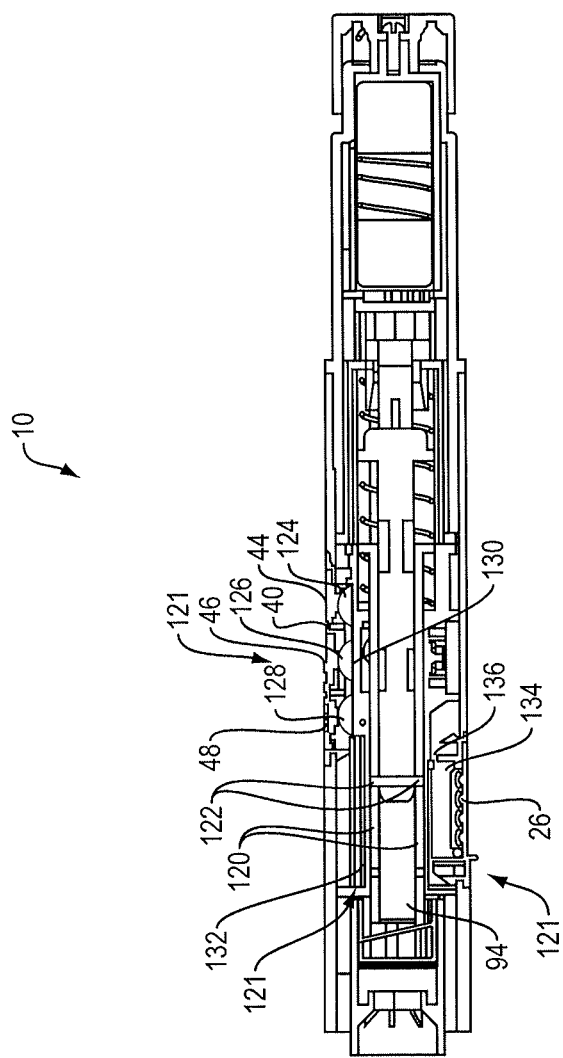

FIGS. 7A and 7B illustrate cross-sectional views of an exemplary embodiment of the assembled training device 10 at 90° offset angles from each other about the longitudinal axis L. The caps 18, 20 have been removed in FIGS. 7A and 7B. As shown in FIG. 7A, the deflectable tabs 56 of the housing 12a interlock with the channels 58 of the housing 12b such that the housing 12a can be selectively coupled to the housing 12b.

Starting at the second (proximal) end 16 of the device 10, as shown in FIG. 7A, the firing button 34 can be fastened to a firing actuator 66 via a fastening device, such as a screw 68. The firing button 34 can have a generally cylindrical body configured to encircle a proximal portion of the housing 12a and can be configured to slide along the longitudinal axis L of the device 10 with respect to the proximal portion of the housing 12a. The firing actuator 66 can at least partially encase a power source, such as batteries 70, and can be displaced along the longitudinal axis L by the firing button 34 to engage a triggering member 72 in response to an actuation of the firing button 34. In the present embodiment, the batteries 70 disposed within the firing actuator 66 can be spaced apart by a biasing member, such as a spring 74, so that at least one of the batteries 70 can be moveably positioned with respect to the another one of the batteries 70 in response to an actuation of the firing button 34.

Referring to FIGS. 7A and 9, the triggering assembly 72 can have a generally cylindrical outer portion 76 and a generally cylindrical inner portion 78. The outer and inner portions 76 and 78, respectively, are spaced away from each other to create a space for receiving the proximal end of the plunger actuation holder 64 between the outer and inner portions 76 and 78, respectively. The triggering member 72 can be urged forward towards the first end 14 of the device 10 via the firing actuator 66 when the firing button 34 is depressed. The inner portion 78 of the triggering member 72 can be configured to engage the plunger 62 to release the plunger from the plunger actuation holder 64, and the outer and inner portions 76 and 78, respectively, can be configured to slide forward to receive the proximal end of the plunger actuation holder 64 when the firing button is depressed.

Referring to FIGS. 7A and 10, the plunger 62 can have generally tubular main body portion 80 and can include a retaining portion 82 extending from the main body portion 80 along the longitudinal axis L towards the second end 16 of the device 10. The main body portion 80 of the plunger 62 can model a plunger of an actual automatic injection device. The retaining portion 82 of the plunger 62 can include a flange 84 and a bifurcated portion 86 extending from the flange 84 towards the second end 16 of the device 10 along the longitudinal axis L. The flange 84 can have a generally circular or cylindrical configuration with a diameter that is greater than the diameter of the main body portion 80. The bifurcated portion 86 can include at least two prongs 88 having retaining tabs 90 formed at the free ends 92 of the prongs 88, which are configured to catch on the proximal end of the plunger actuation holder 64 when the plunger 62 is in the retracted set position.

In some embodiments, the plunger 62 can include an indicator 91 disposed thereon. When the plunger is in the protracted triggered position, the indicator 91 can be configured to align with one of the windows 28 on the housing 12b to indicate a simulated automatic injection. In some embodiments, the operational sequence can be completed when the indicator appears in one of the windows 28, when the indicator appears in one of the windows and the first (distal) end of the training device is removed from the body/surface (e.g., a patient's body), when the audio output by the circuitry is complete, and/or can be complete upon the occurrence or performance of one or more other tasks or operations. The indicator 91 can have a distinctive color or design to represent completion of an injection. Although some embodiments have been described to include the indicator 91 on the plunger, those skilled in the art will recognize that the indicator 91 can be positioned in other locations before aligning with one of the windows. Furthermore, those skilled in the art will also recognize that in some embodiments the indicator can be formed of an illuminative component which may or may not be aligned in one of the windows and which can be illuminated (e.g., via one or more light emitting diodes) upon completion of the injection.

Figure 22:
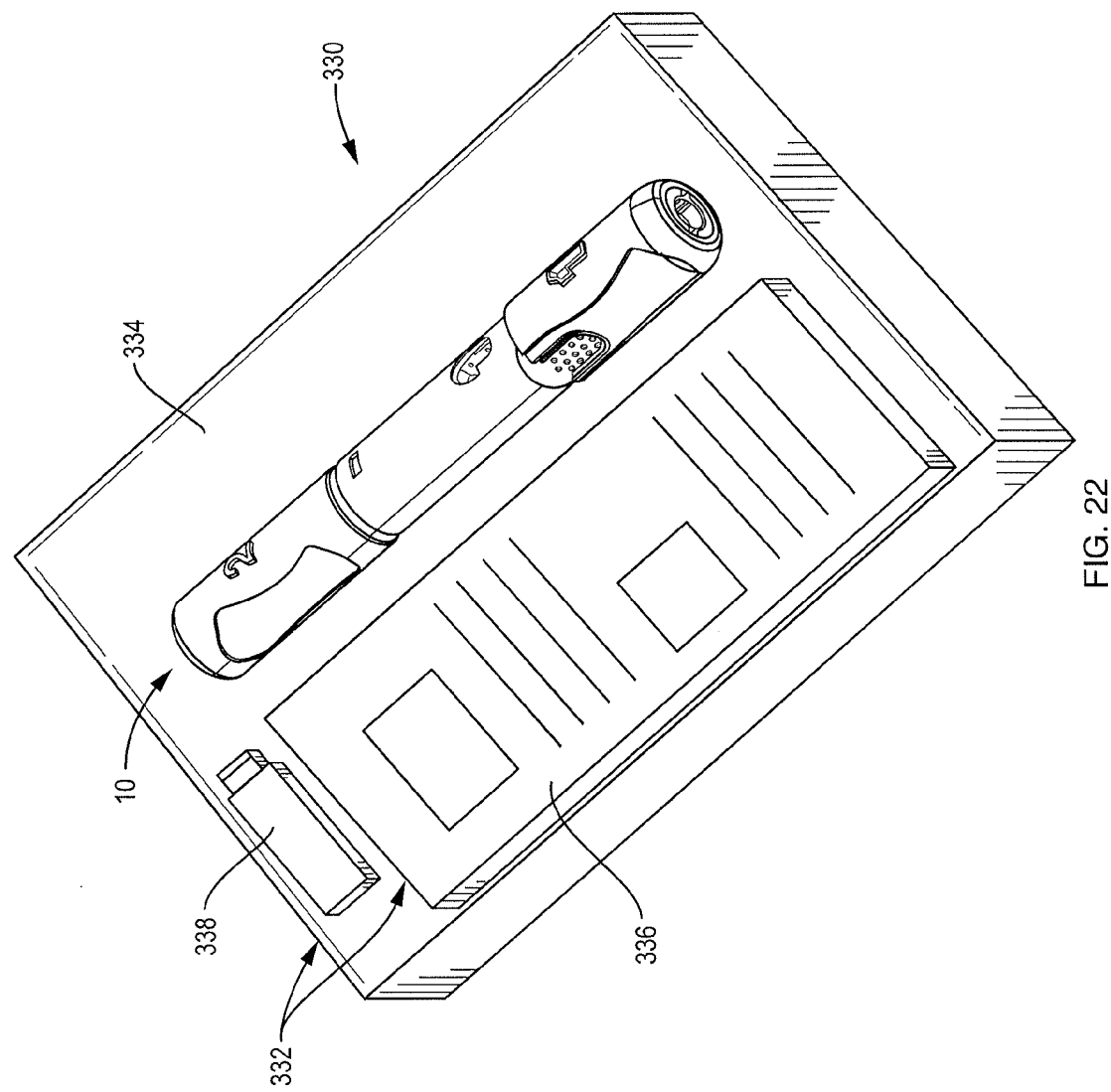
FIG. 22 is an exemplary kit or article of manufacture including an embodiment of the automatic injection training device and informational material, which can be held or stored in a container.

Referring to FIGS. 7A and 11, a sleeve 94 can have a generally tubular translucent body with a hollow interior for receiving the plunger 62 and can have an open distal end. The sleeve 94 can replicate or model a syringe barrel of an actual automatic injection device. The distal end of the sleeve 94 can have guide tabs 96 extending radially outward from the sleeve 94 along the transverse axis T. A proximal end of the sleeve 94 can include a flanged portion 98 extending radially outward about and at least partially encircling a circumference of the proximal end of the sleeve 94. In the present embodiment, the sleeve 94 can be slidingly positioned within the device 10 such that the sleeve 94 can move along the longitudinal axis L towards the first end 14 of the device 10 to assume a protracted triggered position after a simulated autoinjection and can be moved back along the longitudinal axis L towards the second end 16 of the device 10 to assume a retracted set position. As shown in FIGS. 7A and 22, the plunger 62 can extend into the sleeve 94 and can be movable with respect to the sleeve 94 and the spring 60 can be disposed about the exterior of the sleeve 94. In the present embodiment, the flange 84 of the plunger 62 can be configured to abut the flanged portion 98 of the sleeve 94 when the plunger 62 is in the protracted triggered position.

The plunger 62 and/or the sleeve 94 can form a movable member that is movable with respect to the housing 12. As shown in FIGS. 7A, 7B, and 12, an embodiment of the movable member can include the plunger 62 in combination with the sleeve 94. For this embodiment, the plunger 62 and/or sleeve 94 can be movable with respect to each other and/or with respect to the housing 12. As one example, in some embodiments, a position of the sleeve 94 can be fixed and the plunger 62 can move with respect to the sleeve 94 and the housing 12. As another example, the plunger 62 and sleeve 94 can be movable with respect to each other and both the plunger 62 and the sleeve 94 can be movable with respect to the housing 12. As yet another example, the plunger 62 and sleeve 94 can be a unitary member in which the position of the plunger 62 is fixed relative to the sleeve 94 and the unitary member is movable with respect to the housing 12. In some embodiments, the movable member can include the plunger 62 or the sleeve 94. For embodiments in which the movable member includes the plunger 62, the plunger 62 can be movable with respect to the housing 12 to simulate an automatic injection and can include the indicator 91. For embodiments in which the movable member includes the sleeve 94, the sleeve 94 can be movable with respect to the housing to simulate an automatic injection and can include the indicator 91.

Referring to FIGS. 7A and 13, a sleeve carrier 100 can be disposed about at least a portion of the sleeve 94 and can be configured to support at least a portion of the circuitry of the device 10. The sleeve carrier 100 can also be configured to provide an intermediate surface 102 having a washer 104 disposed with respect thereto and upon which the flanged portion 98 of the sleeve 94 can abut when the sleeve is in the protracted triggered position and/or upon which a distal portion of the spring 60 abuts to bias the spring 60 between the intermediate surface 102 of the sleeve carrier 100 and the triggering member 72. A distal surface 106 of the sleeve carrier 100 engages a mock lockout shroud 110 of the device 10.

Referring to FIGS. 7A and 14, the mock lockout shroud 110 can have a generally cylindrical body 112 and can be configured to replicate or model a syringe lockout shroud of an actual automatic injection device. Two elongate members 111 can extend from the cylindrical body 112 of the mock lockout shroud 110. The two elongate members 111 can include slots or channels 114 that receive the guide tabs 96 of the sleeve 94 and permit the guide tabs 96 to slide in a longitudinal direction along the channels 114 so that the sleeve can move between the retracted set position and the protracted triggered position. A spring 116 can be disposed between a proximal end 118 of the cylindrical body 112 and the distal surface 106 of the sleeve carrier to bias the spring 116.

Referring now to FIGS. 7A, 7B, and 10-12, the sleeve 94 of the device 10 can include channels or slots 120 along the longitudinal axis L to receive guide pins 122 of the plunger 62. The channels 120 can guide the guide pins 122 to slide along the longitudinal axis L between the retracted set position and the protracted triggered position. In the assembled device 10, the channels 120 of the sleeve 94 can be opposingly oriented and can be positioned generally perpendicularly to the channels 114 formed in the mock lockout shroud 110 such that the channels 120 are offset about 90° about the longitudinal axis L relative to the channels 114. In exemplary embodiments, a firing assembly can be formed by one or more of the components that are movable with respect to one another and/or with respect to the housing, and that are disposed in the training device 10. For example, in one embodiment, the firing assembly can include the springs 60, 116, the firing actuator 66, the triggering member 72, the sleeve carrier 100, and/or the mock lockout shroud 110.

As shown in FIG. 7B, circuitry 121 can be included within the housing 12b of the device 10. For example, the control interface 40 can include button switches 124, 126, 128, which correspond to buttons 44, 46, 48 (FIG. 5). The button switches 124, 126, 128 can be disposed on an interface circuit board 130 of the control interface 40. The control interface 40 can be in electrical communication with a main circuit board 132 via the connections between the circuit board 130 and the main circuit board 132. The main circuit board 132 can include electrical components to process electrical signals to transmit electrical signals to, and/or to receive electrical signals from the interface circuit board 130 to control an operation of the circuitry 121.

Still referring to FIG. 7B, a speaker 134 can be disposed with respect to the perforated portion 26 of the housing 12b. The speaker 134 can be in electrical communication with a speaker circuit board 136 that can include circuitry to drive the speaker to output audio. For example, the speaker 134 can receive electrical signals from the speaker circuit board to output an audio script to train a user on an operational sequence of an actual automatic injection device using the training device 10. The speaker circuit board 136 can be in electrical communication with the main circuit board 132 and the circuitry 121 on the main circuit board 132 can be configured to transmit electrical signals to and/or receive electrical signals from the speaker circuit board 136 to control an operation of the circuitry 121.

Figure 8:
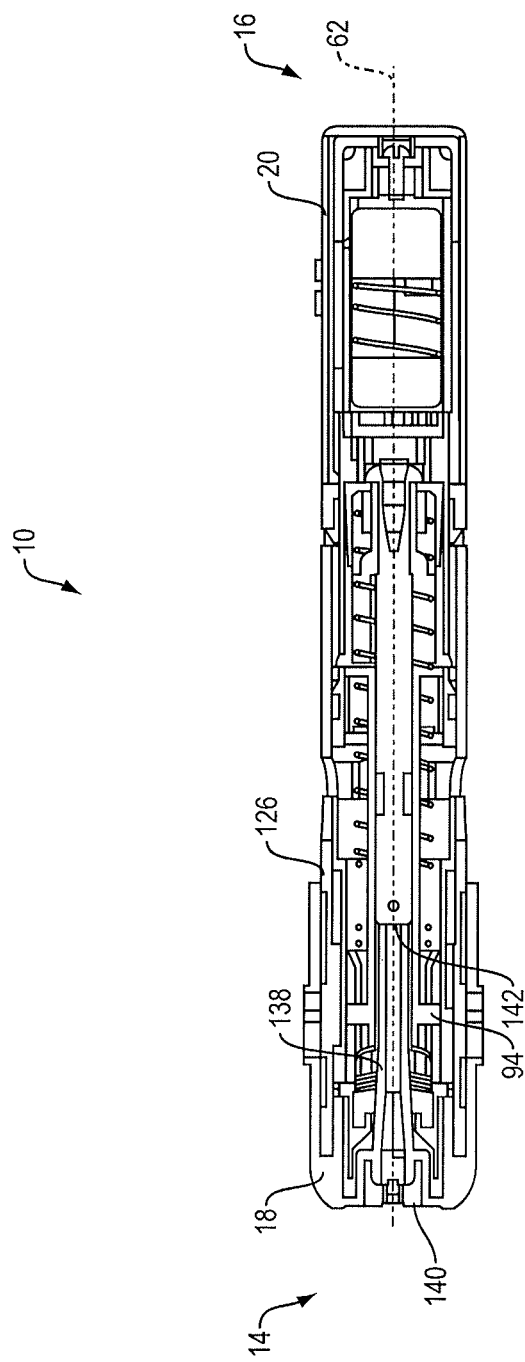
FIG. 8 is a cross-sectional view of the automatic injection training device of FIG. 1 with the end caps disposed on the distal and proximal ends of the training device.

FIG. 8 shows a cross-sectional side view of the device 10 with the end caps 18 and 20 disposed on the first and second ends 14 and 16, respectively. As shown in FIG. 8, the cap 18 includes an elongate resetting member 138 extending longitudinally from a cover portion 140 of the cap 18. The resetting member 138 can be dimensioned and configured to engage the opening 32 formed in the first end 14 of the device 10 such that when the cap 18 is disposed on the first end 14 of the device 10, the resetting member 138 extends into and through the opening 32 of the first end 14 and into the interior of the housing 12b. In exemplary embodiments, the resetting member 138 can be disposed about a center axis of the cap 18 and can have a generally cylindrical shape. The resetting member 138 can taper slightly inward towards the center axis of the cap 18 from the cover portion 140 of the cap 18 to a free end 142 of the resetting member 138. When the cap 18 is disposed with respect to the first end 14, the sleeve 94 can receive the resetting member 138 such that the sleeve 94 substantially surrounds at least a portion of the resetting member 138 and the resetting member can abut the distal end of the actuator component 62. In exemplary embodiments, the resetting member 138 can be used to reset the device 10 after completion of the autoinjection.

In an exemplary mechanical operation, referring to FIGS. 7A and 7B, when the firing button 34, is depressed, the triggering member 72 is biased towards the distal end of the device 10 compressing the spring 74 between the batteries 70. When the firing button 34 is depressed a mechanical click can be output from the training device. As the triggering member 72 advances, the cylindrical releasing portion engages the retaining tabs 90 of the plunger 62, deflecting the tabs 90 inward towards each other until the retaining tabs 90 fit through the plunger actuation holder 64, which selectively retains the plunger 62 in the retracted set position.

Once the retaining tabs 90 are released, the plunger 62 is urged along the longitudinal axis L towards the first (distal) end 14 of the training device 10 by the coil force of the spring 60 from the retracted set position to the protracted triggered position. As the plunger moves towards the distal end 14 of the training device 10, the flange 84 abuts the flanged portion 98 of the sleeve 94, at which point the force of the spring 60 urges the plunger 62 and the sleeve 94 forward along the longitudinal axis L towards the distal end 14 of the training device 10 until the guiding tabs 96 abut the end of the channel 114 and/or the flanged portion 98 abuts annular ledge 104 encircling the sleeve 94, at which point the plunger 62 and the sleeve 94 are in the protracted triggered position. The force of the spring 60 can overcome the opposing force of the spring 116 to urge the sleeve 94 forward. The indicator 91 appears in the inspection window 28 to simulate a completion of an automatic injection. The indicator can begin to appear in the window 28 in no less than about 4 seconds after the firing button 34 is pressed, and completion of the simulated injection occurs in less than about 10 seconds after the firing button 34 is pressed.

In some embodiments, the mock lockout shroud 110 can be moveable along the longitudinal axis L between a retracted set position and protracted triggered position. In one embodiment, when the sleeve 94 is in the retracted set position the guide tabs 96 abut against the proximal end of the channels 114 as shown in FIG. 7A to selective retain the mock lockout shroud 110 in a retracted set position. When the sleeve 94 moves from the retracted set position to the protracted triggered position, the guide tabs 96 advance distally along the channels 114 away from a proximal end of the channel such that the guide tabs 96 no longer abut the proximal ends of the channels 114 and the mock lockout shroud 110 is free to move distally along the longitudinal axis L from the retracted set position to the protracted triggered position. The spring 116 can be biased to urge the mock lockout shroud 110 from the retracted position to a protracted position. In an exemplary operation, the distal end of the mock lockout shroud 110 can be held against the user's body as the sleeve moves from the retracted set position to the protracted triggered position such that the guide tabs 96 move from the proximal end of the channels to the distal end of the channels. As the user removes the distal end of the mock lockout shroud 110 from the body, the spring 116 urges the mock lockout shroud 110 distally such that the channels 114 slide along the guide tabs 96 until the proximal end of the channels abut the guide tabs 96 so that the mock lockout shroud 110 protrudes further out of the distal end of the training device 10 when the sleeve 94 is in the protracted triggered position and the distal end of the training device 10 is not held against a body/surface (e.g., a patient's body).

As shown in FIG. 8, to reset the training device 10, the cap 18 is replaced on the end 14 of the training device 10 and the elongated resetting member 138 engages the distal end of the plunger 62 and urges the plunger 62 towards the second (proximal) end 16 of the training device 10. By pressing the cap 18 onto the first end 14, the training device 10 resets itself and locks springs 60, 116 and plunger 62 in the retracted set position such that the training device 10 is ready for reuse. Once the resetting member 138 urges the plunger backwards towards the proximal end 16 of the training device 10, the force of the spring 116 can urge the sleeve 94 backwards towards the proximal end of the training device to its retracted set position.

Exemplary embodiments of the training device can be configured to include force characteristics corresponding to an actual automatic injection device. For example, a force required to remove the caps 18, 20 can correspond to a force required to remove corresponding caps from the actual automatic injection device. Likewise, a travel time associated with the indicator 91 (i.e. a time it takes the indicator 91 to align with one of the windows 28) can correspond to an actual travel time associated with an indicator in the actual automatic injection device.

Figure 15:
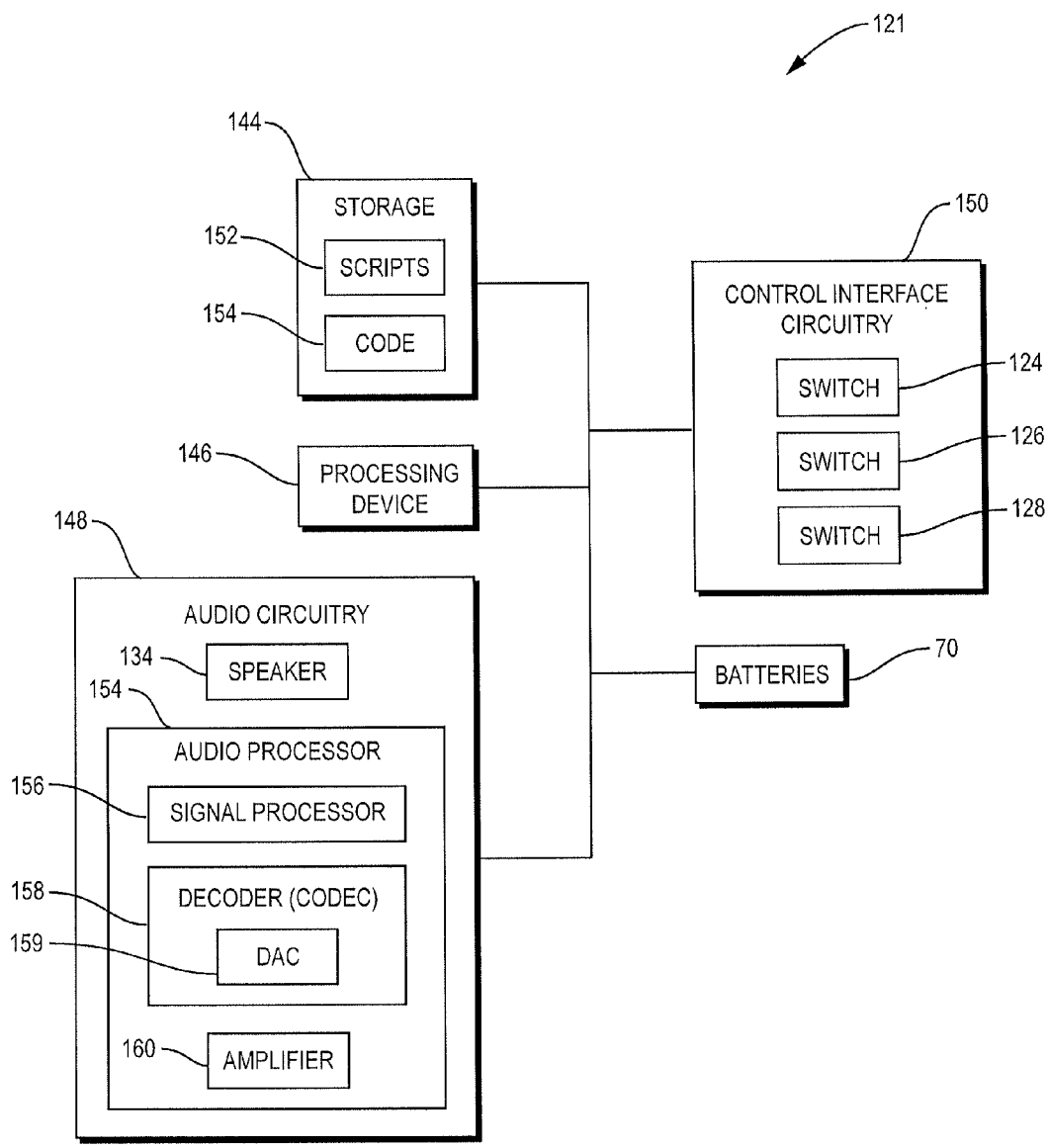
FIG. 15 is a block diagram illustrating an exemplary embodiment of circuitry configured to train a user on an automatic injection.

FIG. 15 is a block diagram illustrating an exemplary embodiment of the circuitry 121 that can be implemented by embodiments of the device 10. The circuitry 121 can include storage 144 (e.g., memory and/or other storage mediums), a programmable or configurable processing device 146, audio circuitry 148, control interface circuitry 150, and the batteries 70. The batteries 70 can be configured to power the circuitry 121 and the circuitry 121 can be configured and/or programmed to output by speech synthesis or by playback of one or more audio scripts 152 of recorded and/or computer generated speech to train a user on an operation of an actual automatic injection device (including an operational sequence associated with the actual automatic injection device) using embodiments of the automatic injection training device 10.

The storage 144 can store the one or more scripts 152 in one or more languages and/or code 154 (e.g., software/firmware) that can be executed by the processing device 146 to control an operation of the circuitry 121 or provide a programmed operational feature of the automatic injection training device. In some embodiments, the scripts 152 can be stored in a digital form using one or more encoding formats, which may or may not use compression algorithms. For example the scripts 152 can be stored in an MP3 format, a FLAC format, WAV format, or any other suitable encoding formats. In one embodiment, two sets of instructional scripts 152 can be stored: one in English and one in Spanish. The code 154 can be implemented using machine language, assembly language, C, C++, Basic, Java, or any suitable software language. The storage 144 can be implemented as non-transitory computer readable medium including, for example, magnetic storage disks, optical disks, flash or solid state storage, and/or any other nonvolatile or volatile storage medium including random access memory, such as DRAM, SRAM, EDO RAM, MRAM, and the like.

The processing device 146 can be in electrical communication with the storage 144, audio circuitry 148, and the control interface circuitry 150. The processing device 146 can be implemented as a microcontroller, microprocessor, field programmable gate array (FPGA), or other programmable or configurable processing device that can control an operation of the circuitry 121. The processing device 146 can execute the instructions 154 based on inputs received from the control interface circuitry 150 and can output one or more of the scripts 152 via the audio circuitry 148. In exemplary embodiments, the processing device 146 can output script segments of the script 152 in sequence and can maintain a record of which portions of the script have been updated, which portion of the script is currently being output, and in what language the script is being output. While the storage 144 and the processing device 146 have been illustrated as separate components, those skilled in the art will recognize that the processing device 146 and the storage 144 can be implemented as an integral component (e.g., a microcontroller or integrated circuit).

The audio circuitry 148 can include the speaker 134 and an audio processor 154, which can include a signal processor 156, a codec 158, and an audio amplifier 160, although one skilled in the art will recognize that the signal processor 156, codec 158, and audio amplifier 160 can be implemented as separate components. The audio processor 154 can receive a digital stream of electrical signals from the processing device 146 that represents the script to be output by the audio circuitry 148, and the audio circuitry 148 can process the digital stream to drive the speaker 134 to output the script 152. In an exemplary embodiment, the signal processor 156 can receive a digital stream of electrical signals representing the script 152 to be output by the audio circuitry 148 and can process the digital stream to decompress and/or enhance the information included in the digital stream. The codec 158 can include a digital-to-analog converter (DAC) 159 to convert the digital stream into an analog stream, which can be output to the audio amplifier 158. The audio amplifier 160 can amplify the analog stream and output the analog stream to the speaker 134 to drive the speaker 134.

The control interface circuitry 150 can include the switches 124, 126, 128, which can provide an interface between the user and the circuitry 121 to facilitate user control of the circuitry 121. For example, actuation of switch 124 by the user can couple or decouple an electrical signal to the processing device 146 to cause the processing device 146 to select between different languages of the scripts 152. Actuation of the switch 126 by the user can couple or decouple an electrical signal to the processing device 146 to cause the processing device 146 to turn the circuitry on or off, and/or to start, pause, and/or stop the output of the script 152. Actuation of the switch 128 can couple or decouple an electrical signal to the processing device 146 to cause the processing device 146 to output the script 152 from a different location in the script 152. In some embodiments, the training device 10 can be configured to prevent advancing or skipping forward through the script to prevent the user from skipping instructional steps in the audio script 152.

In some embodiments, the circuitry 121 can be configured to operate in one or more operation modes. In one operation mode, the circuitry 121 can be configured to continuously output the audio script 152 upon activation of the switch 126 unless one of the switches 124, 126, 128 is subsequently activated. In another operation mode, the circuitry can be configured to output portions of the audio script 152 and can pause the output of the audio script 152 until one of the switches 124, 126, 128 are activated to resume the output of the audio script 152. The operation mode of the circuitry 121 can be controlled by an activation of one or more switches (e.g., switches 124, 126, 128). In one embodiment, the circuitry 121 can switch between a continuous playback mode in which the audio script is continuously output unless one of the switches 124, 126, 128 are activated and an automatic pausing operation mode in which the audio output is paused after each portion of the audio script based on an activation of the switch 126. For example, in one embodiment, the circuitry 121 can operate according the continuous playback mode by default. The user can activate the switch 126 to begin the output of the audio script 152 and the audio script 152 can indicate to the user that if the user wishes to switch to the automatic pausing operation mode, the user should activate the switch 126 again. If the user activates the switch within a time limit, the circuitry 121 operates according to the automatic pausing operation mode. Otherwise, the circuitry 121 continues to operate according to the continuous playback operation mode. While the circuitry defaults to the continuous playback mode in this embodiment, those skilled in the art will recognize that the circuitry can default to the automatic pausing operation mode. Furthermore, while two operation modes have been illustrated in this embodiment, those skilled in the art will recognize that the circuitry can operate according to one, two, or more operation modes.

Figure 16:
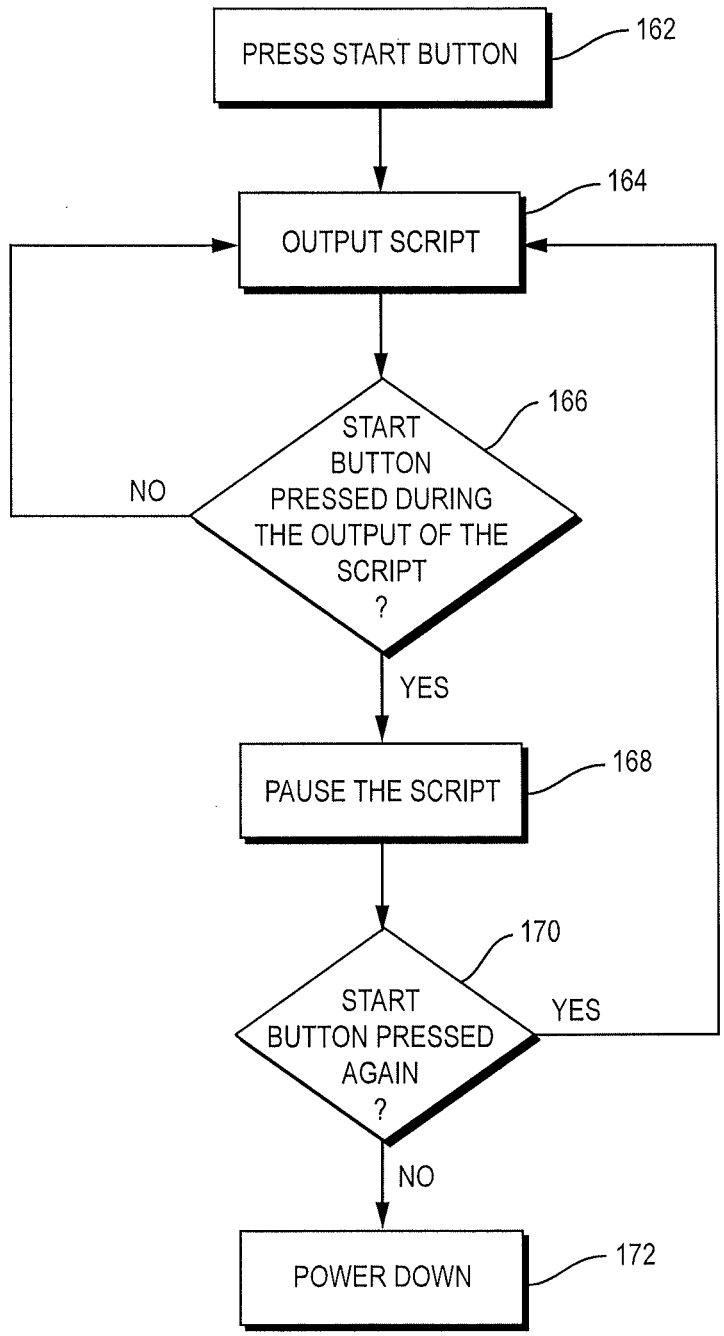
FIG. 16 is a flowchart of an exemplary operation of an embodiment of the circuitry.

FIG. 16 is a flowchart of an exemplary operation of an embodiment of the circuitry 121 with respect to an actuation of the button 46. To begin operation of the circuitry 121, the user can press the button 46 to actuate the switch 126 (step 162) and the circuitry 121 can begin output the script in a selected language (step 164). If the button 46 is pressed again during the output of the script (step 166), the output of the script is paused at its current location (step 168). Otherwise, the output of the script continues. If the script is paused, the circuitry 121 waits for the button 46 to be pressed again. If the button is not pressed again (step 170), the circuitry powers off or goes into a standby state (step 172). If the button 46 is pressed again, the script resumes being output by the circuitry 121 from its current location (step 176) and is played continuously unless the script is paused again.

Figure 17:
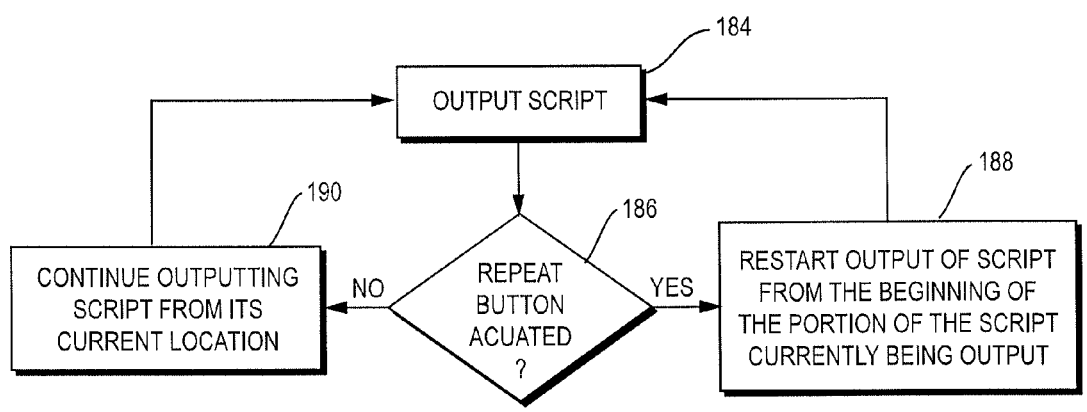
FIG. 17 is a flowchart of another exemplary operation of an embodiment of the circuitry.

FIG. 17 is a flowchart of an exemplary operation of an embodiment of the circuitry 121 with respect to an actuation of the repeat button. During an output of the script (step 184), a user can repeat a previously output portion of the script by press the repeat button (step 186) and the circuitry 121 can restart the script from the beginning of the portion of the script currently being output by the circuitry 121 (step 188). Otherwise, the output of the audio script continues sequentially (step 190)

Figure 18:
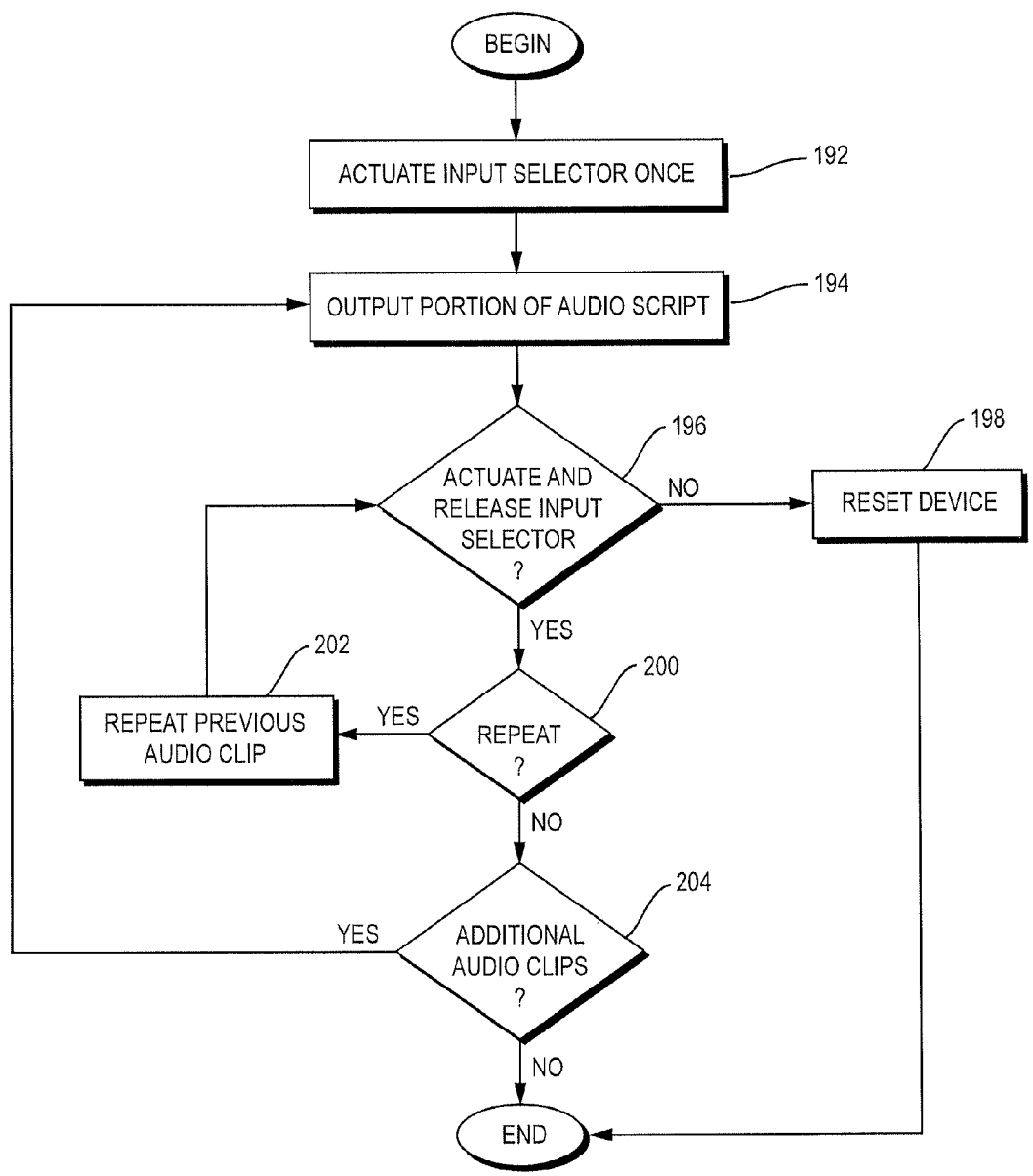
FIG. 18 is a flowchart of yet another exemplary operation of an embodiment of the circuitry.

FIG. 18 is a flowchart of an exemplary operation of an embodiment of the circuitry 121 with respect to an actuation of the start button 46 to repeat audio output of the script. To begin operation of the circuitry 121, the user can press the start button 46 to actuate the switch 126 (step 192) and the circuitry 121 can output a portion of the script (step 194) and then wait for further input from the user (step 196). If the user does not press and release the start button 46 within a predetermined time or holds down the start button 46 (step 196), the device is reset (step 198). If the user presses and releases the start button 46 (step 196), the circuitry can determine whether to repeat the previously output portion of the audio script or to out the next portion of the audio script. If the circuitry determines that the previously output portion of the audio script should be repeated (step 200), the circuitry outputs the previously output portion (step 202) and waits for further user input in step 196 before continuing playback. If the circuitry determines that the previously output portion of the audio script should not be repeated (step 200), the circuitry determines if there are more portions of the audio script to be output in step 204. If it is determined that further portions of the audio script exist (step 204), the circuitry outputs the next portion of the audio script in step 194. For example, if the user presses and releases the start button 46 a single time, the next audio portion can be output and if the user presses and releases the start button twice, the previously output portion of the audio script can be repeated.

In exemplary operation of the training device 10 with the circuitry 121, the user can activate the circuitry 121 by pressing one of the buttons 44, 46, 48 of the control interface to initiate an output of the script to train the user on an operational sequence associated with the training and/or an actual automatic injection device corresponding to the training device. For example, the output of the script can train the user on an automatic injection of a therapeutic agent (e.g., a TNFα inhibitor). The user can press the button 46 to start the audio output of the script 152 from the training device 10. In some embodiments, the audio script can refer to figures, diagrams, and/or instructions included in informational material associated with the automatic training device. The script 152 can instruct the user to identify and prepare an injection site upon which a simulated injection is to be practiced. For example, the script 152 can instruct the user to first wash his/her hands thoroughly and to identify and clean a part of the recipient's body (e.g., using an alcohol swab) to receive the simulated injection from the automatic injection training device 10. In one embodiment, a site of the simulated injection can be the front of a thigh or the abdomen. The script 152 may also inform the user that the two (2) inch area around the navel should be avoided; a different site should be chosen each time an injection is given, and that each new injection should be given at least one inch from a site used previously. The audio output of the script 152 can continue by instructing that for an actual automatic injection area, the user should examine the solution or therapeutic agent, e.g., liquid drug, through the windows on the side of the automatic injection device, e.g., autoinjector pen, to make sure, for example, the liquid is clear and colorless. The audio output of the script can proceed by instructing the user to hold the training device 10 with the first removable cap 18 pointed downward, and may inform the user that such an action may serve to determine the level of the liquid drug within the automatic injection device, e.g., autoinjector pen.

After the preliminary instructions have been output by the circuitry 121, the audio output of the script can proceed by instructing the user to hold the training device in one hand and with the other hand remove first removable cap 18 and can inform the user that when the actual automatic injection device is used, the user should check that the needle sheath of the syringe has come off with the cap. Following removal of the first removable cap 18, the audio output of the script can instruct the user to remove the second removable cap 20 to expose the firing button 34 at the proximal end 16 of the device and can inform the user that after removal of the first and second caps 18, 20, the automatic injection training device 10 is ready to perform the automatic injection and that pressing the activation button under the second removable cap will result in simulation of an automatic injection.

The audio output of the script can continue by instructing the user that once the patient is ready to deliver the simulated automatic injection (e.g., a simulated injection of a therapeutic agent including a TNFα inhibitor), the automatic injection training device 10 should be positioned so that one of the windows 28 is in the user's view and that with the users free hand, a sizable area of the cleaned skin may be gently squeezed at the injection site, creating a platform on which to position the automatic injection training device 10. The script can further instruct the user that the first (distal) end 14 of the automatic injection training device 10 should be positioned at a 90 degree angle flush against the platform of skin, that the firing button 34 can be pressed by the user to initiate an actuation of the firing assembly as described above with respect to FIGS. 7A-7B, and that the user may hear an audible indicator, e.g., click, indicating a start of the simulated injection, and that the automatic injection training device should be held with steady pressure on the injection site until the process is finished, which can be indicated to the user by the appearance of the indicator 91 in the window 28.

After the simulated injection is complete the user may be instructed via the audio output of the script 152 that the cap 18 can be replaced on the first (distal end to reset the device for future use, but that the cap of the actual automatic injection device should not be replace once removed. While exemplary embodiments of an operational sequence has been described herein, those skilled in the art will recognize that the particular operational sequence performed by the user may differ based on, for example, the particular automatic injection device being mimicked by the automatic injection training device 10. Furthermore, the audio output of the script may be continuous, discontinuous, depending on electric signals from sensors associated with the device, dependent on input controls selected by the user, and/or any other activities or conditions.

Figure 19:
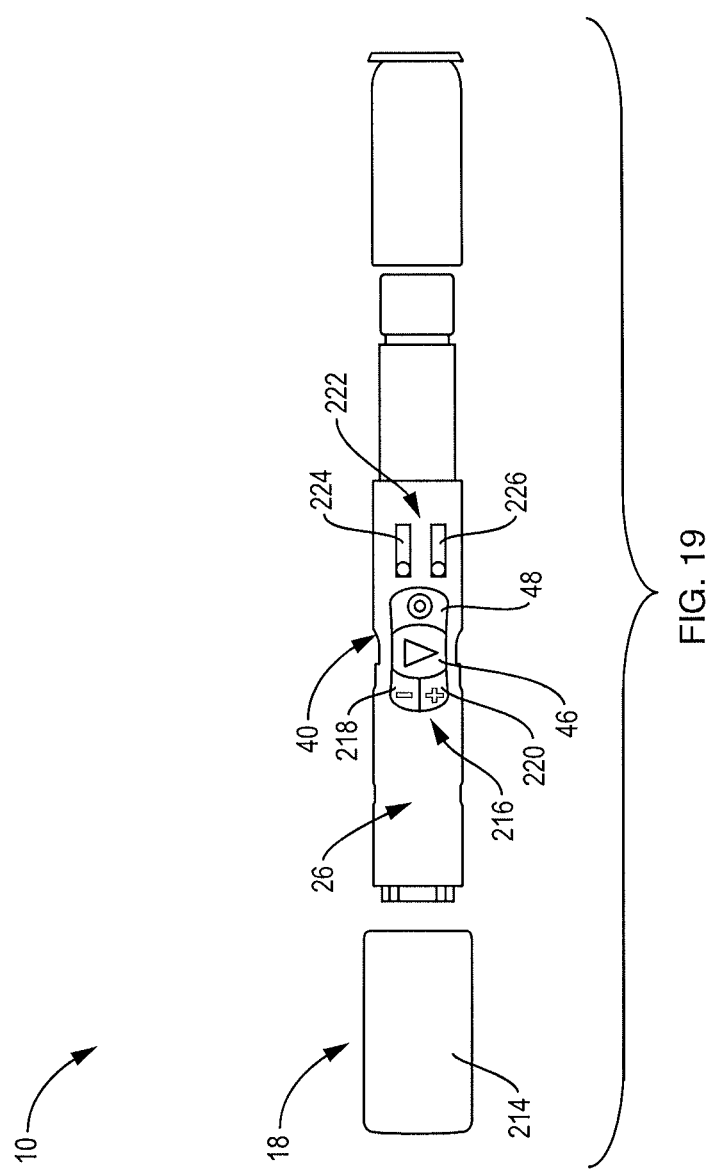
FIG. 19 is a side view of another exemplary embodiment of the automatic injection training device.

FIG. 19 is a side view of another exemplary embodiment of the device 10. As shown in this embodiment, the end cap 18 includes speaker openings 214 formed therein such that when the end cap 18 is disposed on the first end 14 of the device 10, the end cap 18 covers the perforated portion 26 of the housing 12. The control interface 40 can include the buttons 46 and 48, as well as volume controls 216 to control a volume of the script output by the speaker of the device 10. For example, the control interface 40 can include a volume button 218 to interface with the circuitry 121 of the training device 10 to decrease the volume and a volume button 220 to increase the volume. In the present embodiment, the control interface 40 includes toggle switches 222, such as a toggle switch 224 to switch between the different languages that can be output by the device 10 and also includes a toggle switch 226 to switch between different operating modes of the device 10. For example, the toggle switch 226 can allow the user to choose between a first mode of operation in which the script is output in sequence unless one of the controls is actuated by the user and a second mode of operation in which operation of the circuitry is controlled by the controls of the control interface as well as by electrical signals output from one or more of the sensors.

Figure 20:
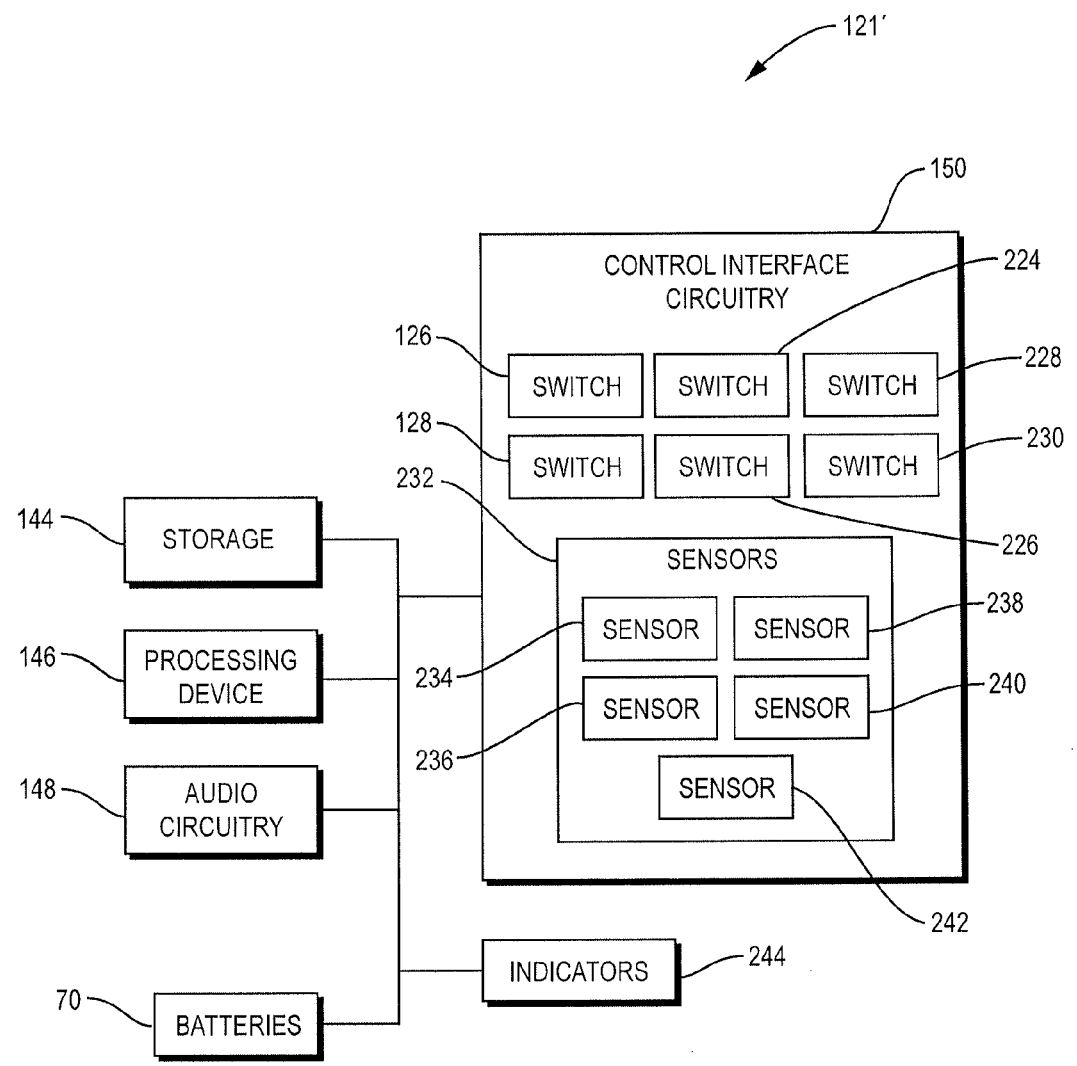
FIG. 20 is a block diagram illustrating another exemplary embodiment of the circuitry that can be implemented by embodiments of the present disclosure.

FIG. 20 is a block diagram illustrating another exemplary embodiment of circuitry 121' that can be implemented by embodiments of the device 10. The circuitry 121' can include the storage 144, the processing device 146, the audio circuitry 148, the control interface circuitry 150, and a power source, e.g., the batteries 70. In the present embodiment, the control interface circuitry 150 can include the switches 126, 128, 224, 226, as well as switches 228, and 230, which can provide an interface between the user and the circuitry 121' to facilitate user control of the circuitry 121' and also can include sensors 232 including, for example, an activator button sensor 234, a sensor 236 to detect whether the first end of the training device is held against a body of the recipient of the simulated autoinjection, a first cap sensor 238, a second cap sensor 240, and an orientation sensor 242. The sensors 232 can be distributed within the training device and can control the operation of the circuitry 121' in conjunction with the switches of the control interface circuitry 150. For example, the sensors 234, 240 can be disposed proximate to the firing button and the sensors 236, 238 can be disposed proximate to the first (distal) end of the training device.

In exemplary embodiments, actuation of switch 224 by the user can couple or decouple an electrical signal to the processing device 146 to cause the processing device 146 to select between different languages of the scripts 152. Actuation of switch 226 by the user can couple or decouple an electrical signal to the processing device 146 to cause the processing device 146 to determine in which operation mode the circuitry will operate. Actuation of switch 228 by the user can couple or decouple an electrical signal to the processing device 146 to cause the processing device 146 to decrease the volume of the output and actuation of the switch 230 can couple or decouple an electrical signal to the processing device 146 to cause the processing device 146 to increase the volume of the output.

The sensors 232 can operate to detect one or more conditions associated with the device 10 to aid in training a user on an automatic injection using the device 10. In exemplary embodiments, the sensors can include proximity sensors (or proximity switches), Hall effect sensors, optical sensors, capacitive sensors, resistive sensors, tactile sensors, accelerometers, gyroscopes, mechanic/displacement sensors (e.g., momentary or toggle switches), or any other sensor suitable for detecting one of more conditions associated with the device 10 and providing an input to the processing device 146.

The activator button sensor 234 can sense whether the firing button 34 has been activated by the user. For example, the sensor 234 can be positioned with respect to the firing button 34 such that when the firing button 34 is depressed a portion of the firing button 34 contacts the sensor 234 to provide an input to the processing device 146 of the circuitry 121'. The processing device 146 can process the input to control an operation of the circuitry 121'. As one example, if the user activates the firing button 34 before instructed and/or before the training device is properly positioned with respect a body/surface (e.g., properly held against a patient's body), the processing device 146 can control the circuitry 121' to output audio indicating that the firing button was activated in error and/or providing corrective instructions. As another example, if the user activates the firing button 34 as instructed and/or when the training device is properly positioned with respect a body/surface (e.g., properly held against a patient's body), the processing device 146 can control the circuitry 121' to output audio acknowledging correct use of the training device. In some embodiments, the processing device 146 can control the circuitry 121' to pause the output of the audio, to repeat previously output audio, and/or can control the circuitry to perform other operations.

The sensor 236 can detect whether the first end is against a body of the recipient of the simulated autoinjection by, for example, sensing a capacitance, resistance, temporary pushbutton/limit switches of the recipient's skin via contacts disposed at the first end 14 of the device 10 or any other sensor suitable for detecting one of more conditions. In one embodiment, the sensor 236 is a switch configured to provide an input to the processing device 146 of the circuitry 121'. For example, conductive contacts can be disposed on the mock lockout shroud 110, which can be movable positioned with respect to the housing 12. When the first distal end of the training device is held against a body/surface (e.g., a patient's body), the mock lockout shroud 110 can be urged along the longitudinal axis towards the proximal end of the training device such that the conductive contacts disposed on the mock lockout shroud 110 and the housing 12 are in electrical communication to provide an input to the processing device 146. In some embodiments, the mock lockout shroud 110 can be segmented and a sensor 236 can be associated with one or more of the segments to assist in detecting whether the first (distal) end of the training device is held perpendicularly to the body/surface.

The processing device 146 can process the input from the sensor 236 to control an operation of the circuitry 121'. As one example, if the user has not properly positioned the training device with respect a body/surface (e.g., not properly held against a patient's body), the processing device 146 can control the circuitry 121' to output audio indicating that the training device is not properly positioned, providing corrective instructions, repeating a previous instruction, and/or can output audio describing the importance of properly positioning the training device before activation of the firing button. As another example, if the user properly positioned the training device with respect a body/surface (e.g., properly held against a patient's body), the processing device 146 can control the circuitry 121' to output audio acknowledging correct use of the training device. In some embodiments, the processing device 146 can control the circuitry 121' to pause the output of the audio, to repeat previously output audio, and/or can control the circuitry to perform other operations.

The first cap sensor 238 can detect whether the cap 18 has been removed. For example, the sensor 238 can be a proximity sensor positioned proximate to the cap 18 when the cap 18 is disposed on the first end of the training device 10 such that the sensor 238 can detect when the cap is removed from the first end of the device 10 by the user. For example, upon removal of the cap 18, the sensor 238 can provide an input to the processing device 146 of the circuitry 121'. The processing device 146 can process the input to control an operation of the circuitry 121'. As one example, if the user removes the cap 18 before instructed, the processing device 146 can control the circuitry 121' to output audio indicating that the cap 18 was removed in error and/or providing corrective instructions. As another example, if the user removes the cap 18 as instructed, the processing device 146 can control the circuitry 121' to output audio acknowledging correct use of the training device. In some embodiments, the processing device 146 can control the circuitry 121' to pause the output of the audio, to repeat previously output audio, and/or can control the circuitry to perform other operations.

The second cap sensor 240 can detect whether the cap 20 has been removed by the user. For example, the sensor 240 can be an optical sensor configured to reflect electromagnetic radiation off of the cap 20 when it is disposed on the second end of the device 10 such that the sensor 240 is configured to detect when the cap 20 is removed. For example, upon removal of the cap 20, the sensor 240 can provide an input to the processing device 146 of the circuitry 121' and the processing device 146 can process the input to control an operation of the circuitry 121'. As one example, if the user removes the cap 20 before instructed, the processing device 146 can control the circuitry 121' to output audio indicating that the cap 20 was removed in error and/or providing corrective instructions. As another example, if the user removes the cap 20 as instructed, the processing device 146 can control the circuitry 121' to output audio acknowledging correct use of the training device. In some embodiments, the processing device 146 can control the circuitry 121' to pause the output of the audio, to repeat previously output audio, and/or can control the circuitry to perform other operations.

The orientation sensor 242 can be a gyroscope and can detect an orientation of the device and can provide an input to the processing device 146 that corresponds to the orientation of the training device. If the orientation of the training device is improper during the simulated automatic injection, the processing device 146 can control the circuitry 121' to output audio indicating that the orientation of the training device is improper and/or providing corrective instructions. If the orientation of the device is proper, the processing device 146 can control the circuitry 121' to output audio acknowledging correct use of the training device. In some embodiments, the processing device 146 can control the circuitry 121' to pause the output of the audio, to repeat previously output audio, and/or can control the circuitry to perform other operations.

While exemplary embodiments of the sensors 232 have been described herein, those skilled in the art will recognize that different sensors can be used for each and/or any of the sensor 232.

As shown in FIG. 20, exemplary embodiments of the circuitry 121' can also include one or more indicators 244, such as light sources (e.g., light emitting diodes), that can be illuminated to provide a visual indication to the user. As on example, the indicators 244 can be illuminated to indicate that the circuitry 121' is powered on, a particular output language has been selected, the battery power is low, and so on. As another example, the indicators 244 can correspond to an output of the audio script such that, for example, different portions of the device illuminate when referenced by the audio script and/or the indicators can illuminate to indicate proper or incorrect usage of the training device 10 based on feedback from one or more of the sensors 232.

In some embodiments, the circuitry 121' can be configured to operate in one or more operation modes. In one operation mode, the circuitry 121' can be configured to continuously output the audio script 152 upon activation of the switch 126 unless one of the switches 124, 126, 128, 224, 226, 228, 230 is subsequently activated. In another operation mode, the circuitry 121' can be configured to output portions of the audio script 152 and can pause the output of the audio script 152 after each portion until one of the switches 124, 126, 128, 224, 226, 228, 230 are activated to resume the output of the audio script 152. In another mode of operation, the circuitry 121' can be configured to output portions of the audio script 152 and can pause the output of the audio script 152 until an input is received from one or more of the sensors 232, can provide feedback including acknowledgment that an instruction has been completed correctly based on an input received from one or more of the sensors 232, and/or can provide corrective instructions based on an input received from one or more of the sensors 232.

In an exemplary operation, when the toggle switch 226 is actuated to select a first operation mode of the device 10, the circuitry 121' can operate without the sensors 232 and can output the audio script continuously or with pauses in between portions of the audio script. In another exemplary embodiment, when the toggle switch 226 is actuated to select the second operation mode of the device 10, the circuitry can operate with the sensors 232 and can implement a process that trains the user on an operation, use, process of using an actual automatic injection device using the training device and/or that trains a user on performing an automatic injection at least in part based on electrical signals output by one or more the sensors 232 that are input to the processing device 146. For example, the circuitry 121' can control the audio output of the script to acknowledge a correct execution of an instruction based on an output of one or more of the sensors 232 and/or can identify an error in the execution of an instruction based on an output of one or more of the sensors 232. In some embodiments, when a user makes an error (e.g., incorrectly follows an instructions), the circuitry can be configured to keeps a record of the error, and can be configured to output more elaborate audible instructions the next time the instruction for which the error occurred is to be output.

Embodiments of the training device 10 can be in communication with one or more other devices, such that the circuitry (e.g., circuitry 121 or 121') can be in electrical communication with other devices, e.g., a computing device to receive software and/or script updates. The training device can be communicatively coupled to the other devices via wired or wireless communication. For example, the training device can be communicative coupled to other devices via a universal serial bus (USB) cable, an RJ-45 cable, an RS-232 cable, or any other suitable cable, and/or can be wirelessly connected to external devices using radio frequency, Bluetooth, IEEE 802.11 standards, near field communication protocols, and/or any suitable wireless communication technology.

Figure 21:
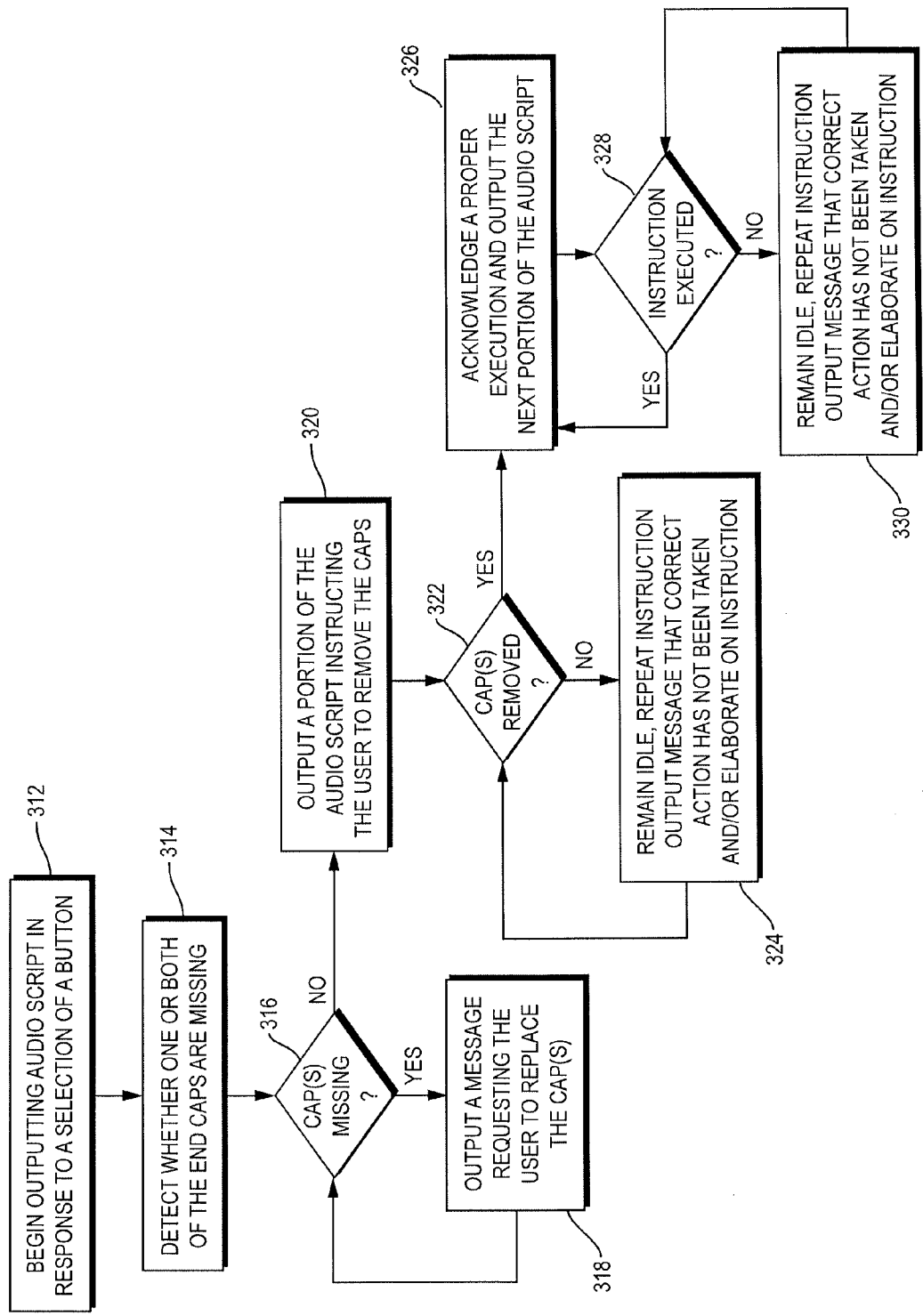
FIG. 21 is a flowchart of another exemplary operation of an embodiment of the circuitry.

FIG. 21 is a flowchart of another exemplary operation of an embodiment of circuitry of the automatic injection training device. As shown in FIG. 21, the circuitry can be configured to begin outputting the audio script in response to a selection of a button (e.g., button 46) on the control interface (e.g., control interface 40) (312). The circuitry can detect whether one or both of the end caps are missing (e.g., already removed) using the sensors of the circuitry (e.g., sensors 238, 240) (314). If the one or both of the caps are missing (316), the circuitry can output a message requesting the user to replace the cap(s) (318). If the circuitry detects that the caps are present (316), the circuitry proceeds by outputting a portion of the audio script instructing the user to remove the caps (320). Using the sensors, the circuitry can determine whether the caps have been removed. If the caps have not been removed (322), the circuitry can remain idle, can repeat the instruction, and/or can elaborate on the instruction (324). Otherwise, the circuitry can output a message acknowledging a proper execution of the instruction and can output the next portion of the audio script to instruct the user to perform another task in the automatic injection sequence (326). The circuitry can detect whether the instruction has been executed. If the instruction has not been executed (328), the circuitry can remain idle, can repeat the instruction, and/or can elaborate on the instruction (324). If the instruction has been executed correctly (328), the process repeats from step 326 until the automatic injection sequence is complete.

Exemplary embodiments of the present disclosure provide articles of manufacture or kits that include embodiments of the automatic injection training device. An article of manufacture or a kit refers to a packaged product comprising the automatic injection device of the invention. In one exemplary embodiment, as shown in FIG. 22, a kit 330 can include an embodiment of the automatic injection device 10 and informational material 332. In exemplary embodiments, the kit 330 can include a container 334 for storing and/or transporting the automatic injection training device 10 and the informational material 332. The informational material 332 can include information corresponding to a description of the automatic injection training device, a description of a corresponding actual automatic injection device, and/or information to train the user on a use of the automatic injection device using the training device.

In some embodiments, the informational material 332 can include one or more printed documents 336, typically formed by at least one substrate having ink or toner disposed thereon to form text and/or illustrations. For example, the informational material can include one or more pamphlets, booklets, Leaflets, labels, books, package inserts, operation manuals, instructional guides, and/or other tangible materials. The term "package insert" is used to refer to instructions customarily included in commercial packages of therapeutic products that contain information about the indications, usage, dosage, administration, contraindications and/or warnings concerning the use of such therapeutic products. In one embodiment, the package insert is a label for a therapeutic agent the injection of which is simulated using the automatic injection training device.

In some embodiments, the informational material 332 can include an electronic media device 338, such as a digital versatile disc (DVD), a CD-ROM, and/or a flash drive storing files that can be accessed via an electronic device, such as a computing device, DVD player, CD player, MP3 player, or any other suitable electronic device that allows the user to access the instructional information.

In some embodiments, the information included in the informational material can include a transcript of the audio script output by the circuitry (e.g., circuitry 121 and 121') in a printed form and/or stored in a digital form, and/or can include a copy of the audio script in stored as an audio file on an electronic media device.

In some embodiments, the information included in the informational material can include instructions on the use of the automatic injection training device in the form of text, images, audio, and/or video. The instructions can provide a guided overview of the operation of the automatic injection device and/or can include step-by-step instructions to train the user on an operational sequence of an actual automatic injection device using the training device. The instructions can overlap, supplement, and/or add to the information included in the audio script.

In some embodiments, the informational material can include promotional material including promotional material corresponding to products and/or services available to the user.

In some embodiments, the informational material can include one or more universal resource locators (URLs) to direct the user to one or more websites that include, supplement, overlap, and/or add to the instructional information and/or promotional information.

Those skilled in the art will recognize, or be able to ascertain using no more than routine experimentation, many equivalents to the specific embodiments of the invention described herein. Such equivalents are encompassed by the following claims. The contents of all references, patents, patent applications, and published patent applications cited throughout this application are incorporated herein by reference.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An automatic injection training device to simulate an automatic injection, the training device comprising:
   an elongate housing extending along a longitudinal axis, the housing having a proximal end and a distal end, the proximal end including an actuation member;
   a movable member disposed within the housing, the movable member being movable with respect to the housing;
   a firing assembly disposed within the housing to actuate the movable member to simulate an automatic injection in response to an activation of the actuation member;
   circuitry disposed within the housing to control an output of audio to train a user on an operational sequence of an actual automatic injection device using the training device; the circuitry comprising:
   audio circuitry to output the audio;
   a nonvolatile storage device to store the audio output by the audio circuitry;
   a programmable processing device configured to control the output of the audio; and
   one or more sensors to sense a condition of the training device to provide an input to the programmable processing device to control an operation of the circuitry; and
   an end cap configured to reset the training device after an actuation of the movable member.

2. The training device of claim 1, wherein the movable member comprises a sleeve.

3. The training device of claim 2, wherein the sleeve is movable with respect to the housing between a retracted position and a protracted position and comprises a generally tubular body extending along the longitudinal axis, the sleeve being biased in the retracted position by a second biasing member.

4. The training device of claim 3, wherein the sleeve is urged from the retracted position to the protracted position in response to an actuation of the actuation member.

5. The training device of claim 1, wherein the movable member comprises a plunger.

6. The training device of claim 5, wherein the plunger is movable with respect to the housing between a retracted position and a protracted position and comprises a main body portion and a retaining member extending along the longitudinal axis.

7. The training device of claim 6, wherein the firing assembly further comprises:
a plunger actuation holder to selectively retain the plunger in the retracted position; and
a biasing member configured to bias the plunger to the protracted position.

8. The training device of claim 7, wherein an actuation of the actuation member releases the plunger from the plunger actuation holder and the biasing member urges the plunger along the longitudinal axis towards the distal end of the housing from the retracted position to the protracted position.

9. The training device of claim 1, wherein the movable member comprises a plunger and a sleeve, the sleeve surrounding at least a portion of the plunger, the plunger being movable with respect to at least one of the sleeve and the housing.

10. The training device of claim 9, wherein the sleeve and the plunger are movable with respect to each other, and each are movable with respect to the housing.

11. The training device of claim 1, wherein the circuitry includes a power source.

12. The training device of claim 1, further comprising a control interface disposed with respect to the housing to provide an interface between the user and the circuitry, the control interface including one or more controls to control an operation of the circuitry.

13. The training device of claim 1, wherein the circuitry further comprises control interface circuitry in electrical communication with the programmable processing device to control an operation of the programmable processing device.

14. The training device of claim 13, wherein the control interface circuitry comprises a control operable by the user to provide an input to the programmable processing device to control an operation of the circuitry.

15. The training device of claim 14, wherein the control includes at least one of an output language selector to select an output language of the audio and an audio playback control to start the output of the audio.

16. The training device of claim 1, further comprising a visual indicator corresponding to an operation of the training device.

17. The training device of claim 16, wherein the visual indicator is a light source.

18. The training device of claim 17, wherein the light source is a light emitting diode.

19. The training device of claim 17, wherein the light source indicates a status of an operation of the training device.

20. The training device of claim 17, wherein the light source illuminates a portion of the housing to correspond to the output of the audio.

21. The training device of claim 16, wherein the indicator is disposed with respect to the movable member.

22. The training device of claim 21, wherein the indicator is a solid color graphic.

23. The training device of claim 1, wherein the circuit is configurable to output the audio in different languages.

24. The training device of claim 1, wherein the circuitry is configured to operate in at least one of a first mode, in which the audio is output by the circuitry without determining whether an operation of the training device corresponds to the audio, and a second mode, in which the audio is output by the circuitry at least in part in response to a determination that the operation of the training device corresponds to the audio being output.

25. The training device of claim 1, wherein the end cap is disposable with respect to the distal end of the training device.

26. The training device of claim 25, wherein the end cap comprises a resetting member configured to extend through an opening in the distal end of the housing to urge the movable member from a protracted position to a retracted position.

27. The training device of claim 1, wherein the circuitry is configured to be in electrical communication with another device that is remote to the training device.

28. The training device of claim 27, wherein the other device comprises a computing device.

29. The training device of claim 1, wherein the circuitry automatically pauses the output of the audio and restarts the output of the audio in response to an actuation of a playback button.

30. The training device of claim 1, wherein the circuitry is configured to select between continuous output of the audio and automatically pausing the output of the audio.

31. The training device of claim 1, wherein the circuitry includes at least one sensor to monitor an operation of the training device, the circuitry being configured to output at least one of a corrective instruction when the sensor detects that the user incorrectly followed an instruction included in the output of the audio, an acknowledgment when the sensor detects that the user correctly followed an instruction included in the output of the audio, repeat an instruction included in the output of the audio when the sensor detects that the user incorrectly followed an instruction included in the output of the audio, automatically pause the output of the audio in response to an input from the sensor.

32. The training device of claim 1, wherein the circuitry is programmed to output instructions to a user and to confirm that that instruction was completed correctly before advancing the output to a subsequent instruction.

33. The training device of claim 1, wherein the circuitry alerts the user when the user attempts to deviate from the recommended sequence.

34. A method for training a user on an operational sequence of an actual automatic injection device using an automatic injection training device comprising:
receiving an input selection from a user via a control interface of an automatic injection training device, the control interface controlling an operation of circuitry included in the automatic injection training device;
sensing a condition of the training device via one or more sensors;
outputting audio via the circuitry based on the condition of the training device to train the user on an operational sequence of an actual automatic injection device using the automatic injection training device in response to the input selection;
actuating a firing assembly disposed within a housing of the training device to simulate an automatic injection in response to a depression of a firing button disposed at a proximal end of the housing by the user;

urging the plunger disposed within the housing from a retracted set position to a protracted triggered position in response to actuation of the firing assembly;

displaying an indicator to the user to indicate a completion of the automatic injection; and resetting the plunger to the retracted position to facilitate reuse of the automatic injection training device.

35. The method of claim 34, wherein resetting the plunger comprises receiving an end cap on the distal end of the training device, the end cap having a resetting member configured to extend into the training device and to engage the plunger to urge the plunger from the protracted position to the retracted position.

36. The method of claim 34, further comprising:

receiving a second input selection from the user; and performing at least one of stopping an output of the audio in response to the second input selection and restarting the output of the audio to repeat a previously output portion of the audio.

37. The method of claim 34, further comprising:

receiving a language selection from the user to change an output language of the audio; and outputting the audio in the output language selected by the user.

38. The method of claim 34, further comprising:

receiving an operation mode selection from the user, the operation mode selected being at least one of a first mode, in which the audio is output by the circuitry without determining whether an operation of the training device corresponds to the audio, and a second mode, in which the audio is output by the circuitry in response to a determination that the operation of the training device corresponds to the audio; and operating the circuitry according to the operation mode selected.

39. The method of claim 34, further comprising:

releasably retaining a plunger in a retracted set position;

biasing the plunger to urge the actuation to the protracted triggered position upon actuation of the firing assembly;

releasing the plunger in response to the depression of the firing button; and urging the plunger from the retracted set position to the protracted triggered position by the biasing member to simulate an injection.

40. A non-transitory computer-readable medium embedded in an automatic injection training device, the computer readable medium storing instructions executable by a programmable processing device to cause the programmable processing device to:

receive an input selection from a user via a control interface of an automatic injection training device, the control interface controlling an operation of circuitry included in the automatic injection training device;

sense a condition of the training device via one or more sensors;

output audio via a speaker in the automatic injection training device based on the condition of the training device to train a user on an operational sequence of an actual automatic injection device using the automatic injection training device in response to the input selection;

instruct the user to depress a firing button disposed at a proximal end of the housing by the user to actuate a firing assembly disposed within a housing of the training device to simulate an automatic injection; and instruct the user to replace the end cap on the training device to reset the training device.

41. A kit comprising:

an automatic injection training device to simulate an automatic injection;

circuitry disposed within the automatic injection training device programmed to output an audio script to train a user on an operational sequence of an actual automatic injection device; the circuitry comprising:

audio circuitry to output the audio script;

a nonvolatile storage device to store the audio output by the audio circuitry a programmable processing device configured to control the output of the audio; and one or more sensors to sense a condition of the training device to provide an input to the programmable processing device to control an operation of the circuitry;

an end cap configured to reset the training device; and informational material, the informational material including information corresponding to at least one of a description of the automatic injection training device, a description of an actual automatic injection device corresponding to the training device, information to train the user on a use of the automatic injection training device, and information to train the user on a use of the actual automatic injection device.

42. The kit of claim 41, wherein the automatic injection training device comprises:

circuitry configured to train the user on an operational sequence of the actual automatic injection device using the automatic injection training device; and a control interface including controls selectable by the user to control an operation of the circuitry, wherein the circuitry is disposed within the automatic injection training device and the control interface is incorporated into a housing of the automatic injection training device.

43. The kit of claim 41, further comprising a container for holding the automatic injection training device and the at least one printed document.

44. The kit of claim 41, wherein the automatic injection training device comprises:

an elongate housing extending along a longitudinal axis, the housing having a proximal end and a distal end, the proximal end including an actuation member;

a movable member disposed within the housing, the movable member being movable with respect to the housing; and a firing assembly disposed within the housing to actuate the movable member to simulate an automatic injection in response to an actuation of the actuation member.

45. The kit of claim 41, wherein the informational material includes at least one of a digital versatile disc, a CD-ROM, and a flash drive storing at least one of audio information and video information.

46. The kit of claim 41, wherein the informational material includes at least one printed document.

47. A training device comprising:

circuitry to control an output of audio to train a user on an operational sequence of an actual automatic injection device using the training device; the circuitry comprising:

audio circuitry to output the audio script;

a nonvolatile storage device to store the audio output by the audio circuitry a programmable processing device configured to control the output of the audio; and
one or more sensors to sense a condition of the training device to provide an input to the programmable processing device to control an operation of the circuitry; and
a first activation button to activate a firing assembly and a syringe carrier devoid of a therapeutic agent; and
a second activation button to output audio from the training device.

48. The training device of claim 47, further comprising an end cap configured to reset the training device.

49. A method of training a user on an automatic injection of a TNFα inhibitor using an automatic injection training device devoid of the TNFα inhibitor, the automatic injection training device corresponding to an actual automatic injection device including the TNFα inhibitor, the method comprising:

receiving an input selection from a user via a control interface of the automatic injection training device, the control interface controlling an operation of circuitry included in the automatic injection training device;
sensing a condition of the training device via one or more sensors;
outputting audio via the circuitry based on the condition of the training device to train the user on an operational sequence of an automatic injection of the TNFα inhibitor in response to the input selection;
actuating a firing assembly disposed within a housing of the training device to simulate an automatic injection of the TNFα inhibitor in response to a depression of a firing button disposed at a proximal end of the housing by the user;
displaying an indicator to the user to indicate a completion of a simulation of the automatic injection of the TNFα inhibitor; and
resetting the training device using an end cap after actuation of the firing assembly.

50. The method of claim 49, wherein the TNFα inhibitor is adalimumab.

* * * * *